US012228871B2

(12) United States Patent
Ohta et al.

(10) Patent No.: US 12,228,871 B2
(45) Date of Patent: Feb. 18, 2025

(54) FIXING DEVICE FOR SUPPRESSING REDUCED DURABILITY OF A FLEXIBLE ROTARY MEMBER

(71) Applicant: CANON KABUSHIKI KAISHA, Tokyo (JP)

(72) Inventors: Hideki Ohta, Shizuoka (JP); Terutaka Endo, Kanagawa (JP); Seiji Obata, Shizuoka (JP); Jiro Moriya, Shizuoka (JP); Takayuki Mizuta, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/516,810

(22) Filed: Nov. 21, 2023

(65) Prior Publication Data

US 2024/0085832 A1 Mar. 14, 2024

Related U.S. Application Data

(63) Continuation of application No. 17/720,825, filed on Apr. 14, 2022, now Pat. No. 11,846,902, which is a continuation of application No. 17/033,371, filed on Sep. 25, 2020, now Pat. No. 11,320,770, which is a continuation of application No. 16/505,519, filed on Jul. 8, 2019, now Pat. No. 10,824,102, which is a continuation of application No. 15/961,189, filed on Apr. 24, 2018, now Pat. No. 10,386,761, which is a continuation of application No. 15/299,289, filed on Oct. 20, 2016, now Pat. No. 9,983,523, which is a continuation of application No. 14/444,884, filed on Jul. 28, 2014, now Pat. No. 9,513,583.

(30) Foreign Application Priority Data

Jul. 30, 2013 (JP) ................................ 2013-157582
Sep. 30, 2013 (JP) ................................ 2013-205134
Nov. 28, 2013 (JP) ................................ 2013-246805

(51) Int. Cl.
*G03G 15/20* (2006.01)

(52) U.S. Cl.
CPC .................. *G03G 15/2053* (2013.01); *G03G 2215/00143* (2013.01)

(58) Field of Classification Search
CPC ................ G03G 15/2053; G03G 2215/00143
See application file for complete search history.

(56) References Cited

U.S. PATENT DOCUMENTS 5,027,160 A * 6/1991 Okada ................ G03G 15/2003 399/329
2009/0317153 A1* 12/2009 Lee .................... G03G 15/2053 399/329

* cited by examiner

*Primary Examiner* — Walter L Lindsay, Jr.
*Assistant Examiner* — Milton Gonzalez
(74) *Attorney, Agent, or Firm* — Canon U.S.A., Inc. IP Division

(57) ABSTRACT

The present invention provides a fixing device including a flexible cylindrical rotary member and an inner-surface opposing portion that opposes an inner surface of the rotary member at an end portion of the rotary member in a generatrix direction. The inner-surface opposing portion moves upstream in a recording material conveying direction in accordance with lateral shift of the rotary member in the generatrix direction. This restricts the lateral shift of the rotary member.

1 Claim, 32 Drawing Sheets

FIXING DEVICE FOR SUPPRESSING REDUCED DURABILITY OF A FLEXIBLE ROTARY MEMBER

CROSS REFERENCE TO RELATED APPLICATIONS

This application is a Continuation of U.S. application Ser. No. 17/720,825 filed Apr. 14, 2022, which is a Continuation of U.S. application Ser. No. 17/033,371 filed Sep. 25, 2020 and issued as U.S. patent Ser. No. 11/320,770 on May 3, 2022, which is a Continuation of U.S. application Ser. No. 16/505,519 filed Jul. 8, 2019 and issued as U.S. patent Ser. No. 10/824,102 on Nov. 3, 2020, which is a Continuation of U.S. application Ser. No. 15/961,189 filed Apr. 24, 2018 and issued as U.S. patent Ser. No. 10/386,761 on Aug. 20, 2019, which is a Continuation of U.S. application Ser. No. 15/299,289 filed Oct. 20, 2016 and issued as U.S. Pat. No. 9,983,523 on May 29, 2018, which is a Continuation of U.S. patent application Ser. No. 14/444,884 filed Jul. 28, 2014 and issued as U.S. Pat. No. 9,513,583 on Dec. 6, 2016, which claims the benefit of Japanese Patent Application No. 2013-157582, filed Jul. 30, 2013, Japanese Patent Application No. 2013-205134, filed Sep. 30, 2013, and Japanese Patent Application No. 2013-246805, filed Nov. 28, 2013, all of which are hereby incorporated by reference herein in their entireties.

BACKGROUND OF THE INVENTION

Field of the Invention

The present invention relates to a fixing device that includes a flexible cylindrical rotary member and that fixes an image formed on a recording material to the recording material.

Description of the Related Art

In a fixing device that is mounted on an image forming apparatus using an electrophotography recording system and that uses a flexible rotary member, lateral shift of the rotary member in a generatrix direction during rotation of the rotary member is a problem. In order to restrict the lateral shift, a restricting member that restricts the lateral shift of the rotary member is sometimes provided at a position that opposes an end surface of the rotary member. Japanese Patent Laid-Open No. 2011-248285 discloses a fixing device including such a restricting member.

However, there is a demand for recent image forming apparatuses to provide high speed and save energy. This demand has caused an increase in the rotation speed of a rotary member and an increase in the pressure applied to an end surface of the rotary member when the rotary member contacts the lateral shift restricting member. In addition, in order to restrict the heat capacity of the rotary member, the thickness and diameter of the rotary member are being reduced. Therefore, the pressure per unit area applied to the end surface of the rotary member is increased. Further, there is a demand for recent image forming apparatuses to have a long life. This has increased the time that the end surface of the rotary member slidingly rubs the lateral shift restricting member. Accordingly, as the performance required of image forming apparatuses is improved, the end surface of the rotary member is becoming susceptible to scraping and the durability of the rotary member is becoming insufficient.

Therefore, further improvement is demanded of a mechanism that restricts lateral shift of the rotary member.

SUMMARY OF THE INVENTION

The present invention is carried out considering such a problem, and provides a fixing device that is capable of suppressing a reduction in durability of a flexible rotary member.

To this end, according to a first aspect of the present invention, there is provided a fixing device including:

- a flexible cylindrical rotary member that rotates while contacting a recording material on which an image has been formed; and
- an inner-surface opposing portion that opposes an inner surface of the rotary member at an end portion of the rotary member in a generatrix direction, wherein the inner-surface opposing portion moves upstream in a recording material conveying direction in accordance with lateral shift of the rotary member in the generatrix direction.

According to a second aspect of the present invention, there is provided a fixing device including:

- a flexible cylindrical rotary member that rotates while contacting a recording material on which an image has been formed; and
- a movable member that opposes an end surface of the rotary member in a generatrix direction of the rotary member, the movable member including an inner-surface opposing portion and an end-surface opposing portion, the inner-surface opposing portion opposing an inner surface of the rotary member at an end portion of the rotary member in the generatrix direction, the end-surface opposing portion opposing the end surface of the rotary member,
- wherein, when the rotary member is laterally shifted in the generatrix direction and pushes the end-surface opposing portion, the rotary member moves upstream in a recording material conveying direction by a force for pushing the end-surface opposing portion by the rotary member.

According to a third aspect of the present invention, there is provided a fixing device including:

- a flexible cylindrical rotary member that rotates while contacting a recording material on which an image has been formed; and
- an outer-surface opposing portion that opposes an outer surface of the rotary member at an end portion of the rotary member in a generatrix direction,
- wherein the outer-surface opposing portion moves upstream in a recording material conveying direction in accordance with lateral shift of the rotary member in the generatrix direction.

Further features of the present invention will become apparent from the following description of exemplary embodiments with reference to the attached drawings.

DESCRIPTION OF THE EMBODIMENTS

First Embodiment

Figure 1:
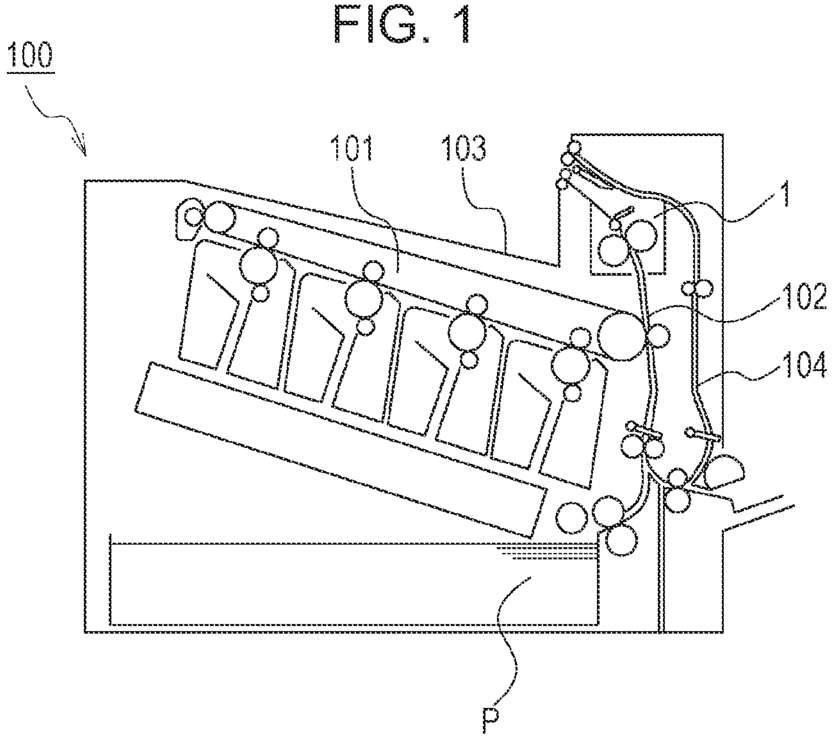
FIG. 1 is a sectional view of an image forming apparatus.

FIG. 1 is a sectional view of a printer (image forming apparatus) 100 using an electrophotography recording system and on which a fixing device 1 is mounted. A full-color toner image that is formed by superimposing toner images of four colors in an image forming section 101 is transferred by a transfer section 102 to a recording material P fed from a feeding unit. The toner image transferred to the recording material P is heat-fixed to the recording material at the fixing device 1. The recording material P to which the toner image has been fixed is discharged to an output tray 103. In duplex printing, after transferring and fixing the toner image to a first side of the recording material, the recording material is redirected and conveyed to a duplex conveying path 104, so that an image is formed on a second side of the recording material by an operation that is similar to the operation that has been performed for forming the image on the first side. These image forming operations are known, so that they are not described in detail below.

Figure 2:
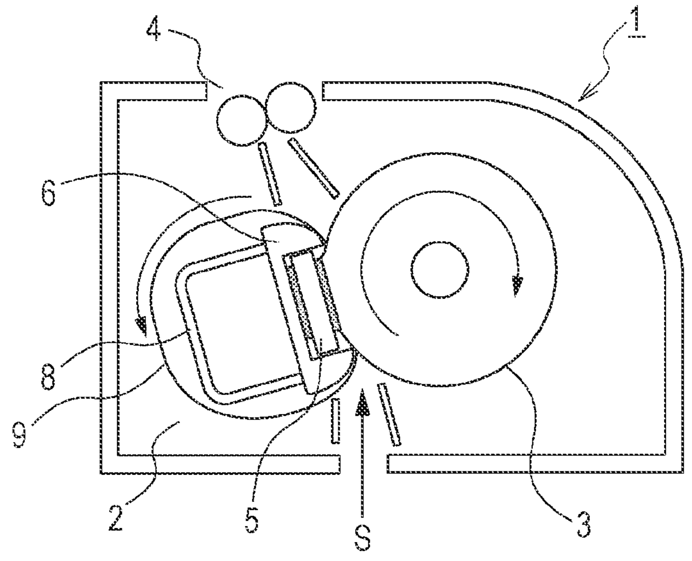
FIG. 2 is a sectional view of a fixing device.
Figure 3A:
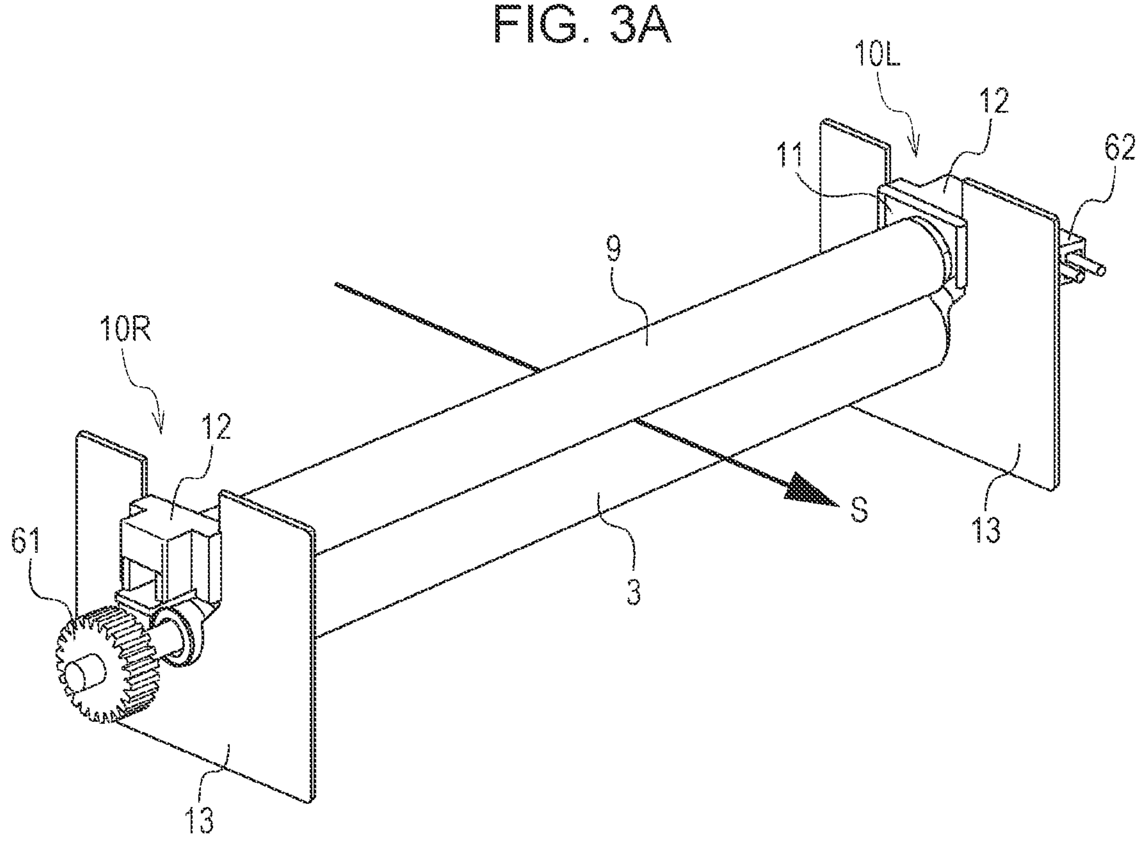
FIGS. 3A and 3B are, respectively, a perspective view and a sectional view of an internal portion of the fixing device.
Figure 3B:
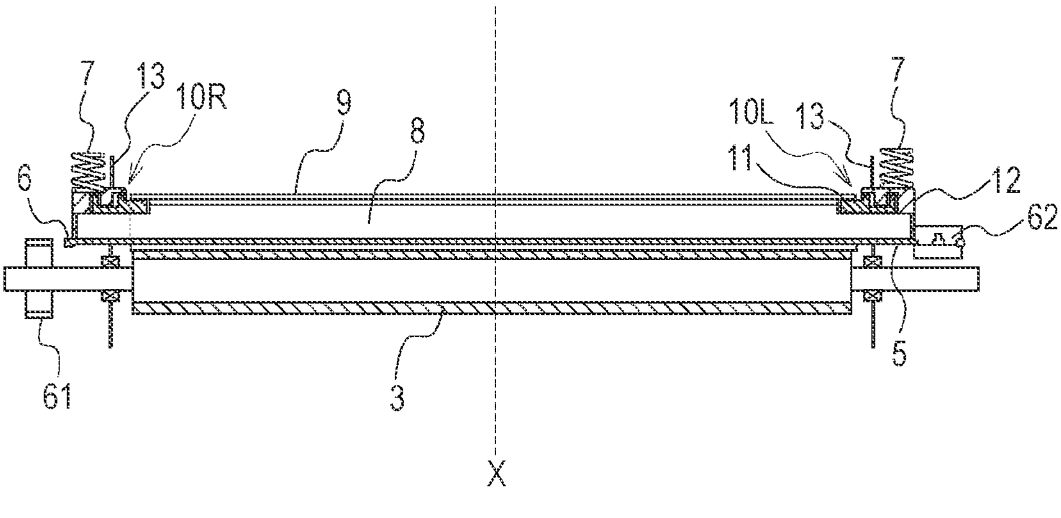

FIG. 2 is a schematic sectional view of the fixing device 1. FIG. 3A is a perspective view of an internal portion of the fixing device. FIG. 3B is a sectional view of the internal portion of the fixing device when the fixing device is seen from a recording-material discharging side. An arrow S represents a conveying direction of the recording material P, and a broken line X represents the center of the fixing device in a longitudinal direction. In the fixing device according to the embodiment, the broken line X is a conveyance reference of the recording material P. The recording material P is, regardless of its size, conveyed with its center in a width direction being aligned with the broken line X.

The fixing device 1 includes, for example, a heating unit 2, a roller 3 that, along with the heating unit 2, forms a fixing nip portion, and conveying rollers 4 that convey a recording material to which an image has been fixed. The heating unit 2 includes a flexible cylindrical rotary member (cylindrical belt, cylindrical film) 9 (hereunder referred to as "belt 9") and a heater 5 that heats the belt by contacting an inner surface of the belt 9. The heating unit 2 further includes, for example, a heater holder 6 and a stay 8. The heater holder 6 holds the heater 5. The stay 8 is provided for maintaining the rigidity of the heating unit 5. In the embodiment, the heater 5, the heater holder 6, and the stay 8 form a backup unit that contacts the inner surface of the belt 9 in a generatrix direction of the belt. A stretching roller is not provided at the inner surface of the belt 9. Accordingly, the belt 9 is not stretched. The roller 3 has a rubber layer, and forms, along with the backup unit, a fixing nip portion N with the belt 9 disposed therebetween. The fixing nip portion N nips and conveys the recording material. The roller 3 is driven by a motor (not shown) via a gear 61. The belt 9 is rotated by following the rotation of the roller 3.

As shown in FIG. 3A, U-shaped recesses for mounting two bearings of the roller 3 are provided in frames 13 of the fixing device. The two bearings that are provided at respective shaft end portions of the roller 3 are held in the recesses. Correcting mechanisms (may also be called "movement mechanisms") 10L and 10R that correct the inclination of the belt 9 are provided at corresponding end portions of the backup unit. By disposing the correcting mechanisms at these positions, the correcting mechanisms 10L and 10R oppose the end surfaces of the belt 9. The correcting mechanisms 10L and 10R are each provided with a holding member 12 (described later). By providing grooves 12*f* of the holding members 12 at the U-shaped recesses of the frames 13 (see FIG. 4A), the heating unit 2 is held by the frames 13 similarly to the roller 3. Compression springs 7 (first urging members) apply pressure to top surfaces 12*c* of the holding members 12 (see FIG. 4A). The pressure applied by the springs 7 urges the heater 5 towards the roller 3 via the holding members 12, the stay 8, and the heater holder 6. This causes the rubber layer of the roller 3 to be compressed and the backup unit and the roller 3 to form the fixing nip portion N with the belt 9 disposed therebetween. A recording material P that bears a toner image is nipped and conveyed to the fixing nip portion N while contacting the belt 9. During this period, the toner image is heated by the heater 5 via the belt 9, and is fixed to the recording material P.

The belt 9 according to the embodiment includes a base layer formed of heat-resistant resin (to be more specific, polyimide), a surface layer formed of fluorocarbon resin, and a rubber layer (silicone rubber layer) formed between the base layer and the surface layer. The material of the base layer may be a metal, such as stainless steel or nickel. The rubber layer may be left out if not required.

As shown in FIG. 3B, the heater 5 may be elongated in a longitudinal direction of the fixing device (that is, the generatrix direction of the belt 9). The heater 5 is a ceramic heater in which heating generating resistors are printed on a ceramic substrate. Electric power is supplied to the heater 5 via a connector 62 for supplying electric power. The temperature of the heater 5 is monitored by a temperature detecting element (not shown). The electric power supplied to the heater 5 is controlled so that the temperature detected by the temperature detecting element is maintained at a target temperature. The heater holder 6 is formed by molding heat-resistant resin, such as liquid crystal polymer (LCP) or polyphenylene sulfide (PPS). The heater holder 6 is provided with a groove for fitting the heater 5 thereto. By fitting the heater 5 to the groove, the heater 5 is held in the longitudinal direction. The stay 8 is U-shaped in cross section, and is formed of a metal (iron in the embodiment). The stay 8 contacts the holder 6 in the longitudinal direction, and reinforces the holder 6.

Next, the correcting mechanism 10R and the correcting mechanism 10L that correct lateral shift of the belt 9 are described with reference to FIGS. 4A to 8B. The shape of the correcting mechanism 10R and the shape of the correcting mechanism 10L are substantially axially symmetrical with reference to a conveyance reference X of a recording material P. Therefore, only the correcting mechanism 10R is described, and the correcting mechanism 10L is not described.

Figure 4A:
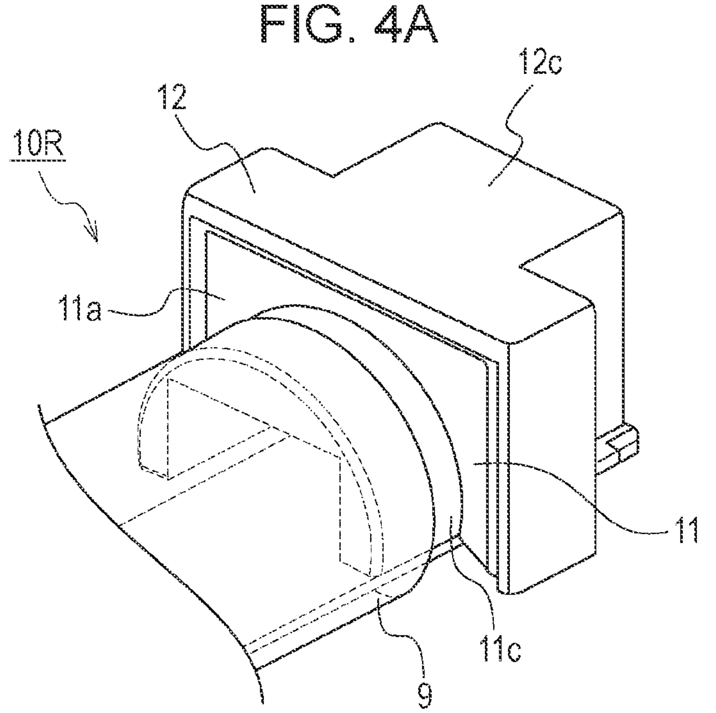
FIGS. 4A and 4B are, respectively, a perspective view and a sectional view of a correcting mechanism according to a first embodiment.
Figure 4B:
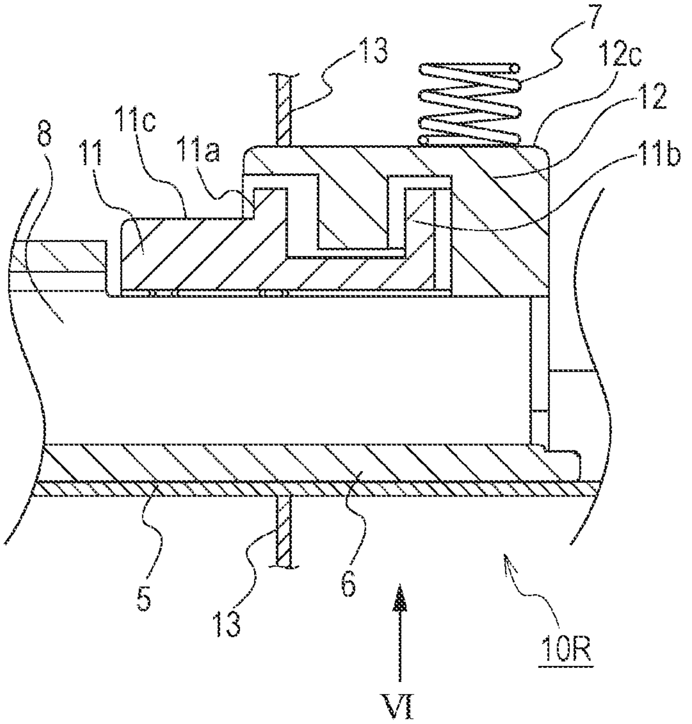
Figure 5A:
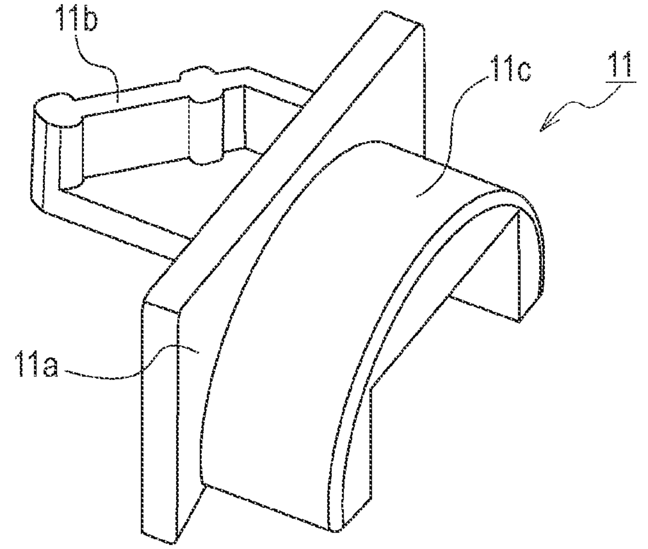
FIGS. 5A and 5B are a perspective view of a movable member and a perspective view of a holding member, respectively.
Figure 5B:
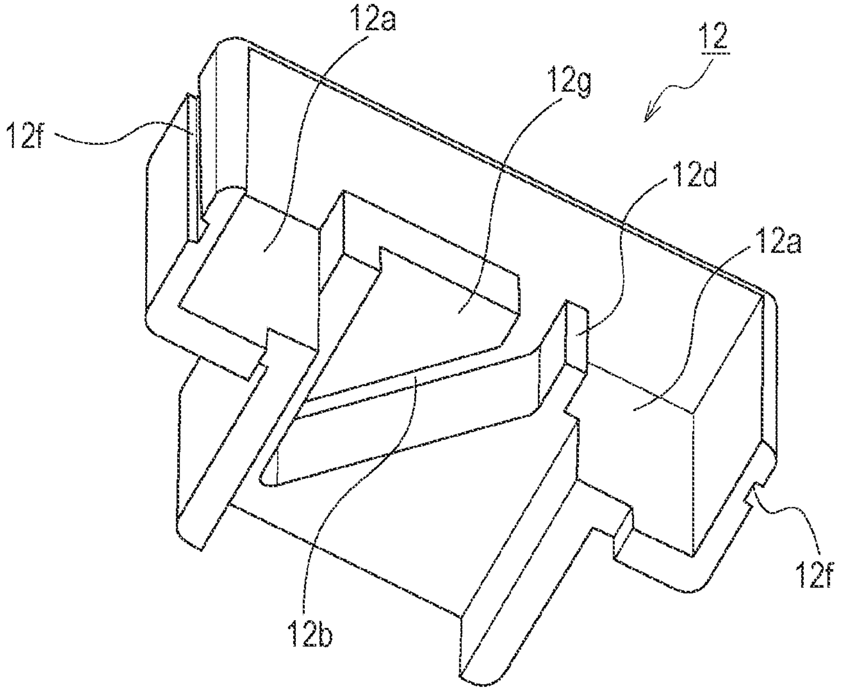
Figure 6:
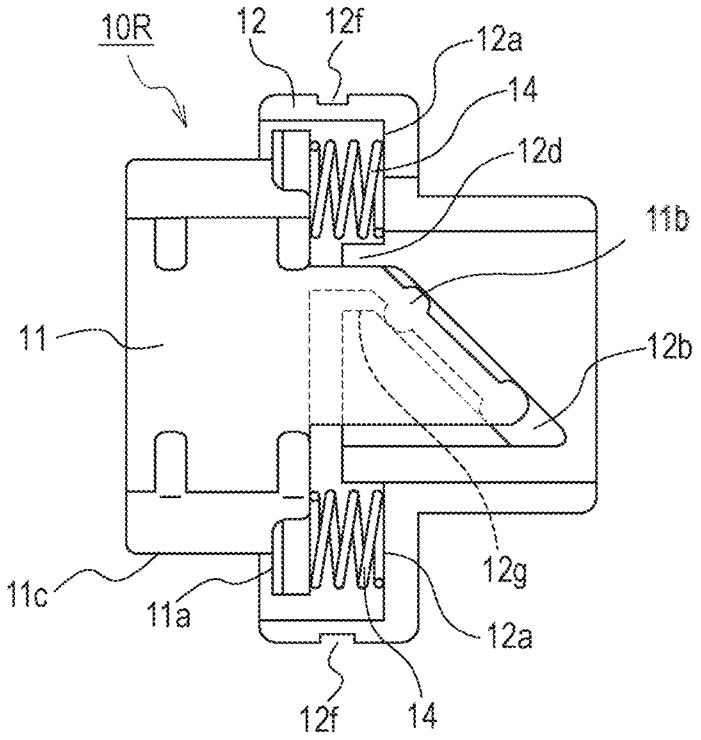
FIG. 6 is a sectional view of the correcting mechanism.

FIG. 4A is a perspective view of the correcting mechanism 10R. FIG. 4B is a sectional view of the correcting mechanism 10R when seen from an upstream side in the conveying direction of a recording material. FIG. 5A is a perspective view of a movable member 11 (described later). FIG. 5B is a perspective view of a holding member 12 that holds the movable member 11. FIG. 6 illustrates the correcting mechanism 10R when seen from the direction of arrow VI in FIG. 4B. FIGS. 7A and 7B and FIGS. 8A and 8B each illustrate a mechanism for correcting the orientation of the belt by the correcting mechanisms.

The correcting mechanism 10R includes the movable member 11, the holding member 12 that holds the movable member 11, and compression springs (second urging members) 14 that urge the movable member 11. As mentioned above, the holding member 12 is fitted to the U-shaped recess of the frame 13 of the fixing device. This substantially determines the position of the holding member 12 in the longitudinal direction of the heater and the position of the holding member 12 in the recording material conveying direction. Since the holding member 12 is urged towards the roller 3 by the springs 7, the holding member 12 is in a substantially secured state.

The movable member 11 is a part that is movably engaged with the holding member 12. The movable member 11 is in contact with a cutaway portion provided at an end portion of the stay 8 in the longitudinal direction. A slight gap is provided between the holding member 12 and a top portion of the movable member 11. As shown in FIG. 4A, the movable member 11 has an end-surface opposing portion 11*a* that opposes an end surface of the belt 9. When the belt 9 is laterally shifted in the generatrix direction thereof, the end surface of the belt 9 collides with the end-surface opposing portion 11*a*. The movable member 11 has an inner-surface opposing portion 11*c* that opposes an inner surface of an end portion of the belt 9. A slight clearance is provided between the inner surface of the belt 9 and the inner-surface opposing portion 11*c*. The inner-surface opposing portion 11*c* has the function of guiding the inner surface of the belt 9 when the belt 9 rotates.

As shown in FIG. 5A, the movable member 11 has a protrusion 11*b* extending obliquely with respect to the longitudinal direction of the heater. As shown in FIG. 5B, the holding member 12 has a recess (guide) 12*b* extending obliquely with respect to the longitudinal direction of the heater. When the movable member 11 and the holding member 12 are combined, the protrusion 11*b* of the movable member 11 is fitted in the recess 12*b* of the holding member 12. By virtue of this structure, the movable member 11 is slidably held along the recess 12*b* of the holding member 12. Reference numerals 14 denote the compression springs that urge the movable member 11 away from a seating surface 12*a* of the holding member 12.

Next, the operations of the correcting mechanisms 10 are described with reference to FIGS. 6 to 8B. FIGS. 6 and 7A each illustrate a state of the correcting mechanism in which the end surface of the belt 9 is not in contact with the end-surface opposing portion 11*a*. When the belt 9 is rotated by following the rotation of the roller 3, the belt 9 contacts the inner-surface opposing portion 11*c* of the movable member 11 in an area that is disposed upstream of the heater 5 in a rotation direction of the belt. In contrast, in an area that is disposed downstream of the heater 5 in the rotation direction of the belt, the belt 9 is separated from the inner-surface opposing portion 11*c* of the movable member 11.

When the end surface of the belt 9 is not in contact with the end-surface opposing portion 11*a*, the movable member 11 that is urged by the springs 14 is positioned at a location that is farthest from the seating surface 12*a* in the holding member 12. At this time, even if the protrusion 11*b* of the movable member 11 collides with a first stopper 12*d* of the holding member 12 and is urged by the springs 14, the movable member 11 is positioned by restricting the movement of the movable member 11.

As shown in FIG. 7A, when the end surface of the belt 9 is not in contact with the end-surface opposing portion 11*a*, the distance between the end surface of the belt 9 and the end-surface opposing portion 11*a* of the movable member 11 is D1. The distance from the seating surface 12*a* of the holding member 12 to the end-surface opposing portion 11*a* of the movable member 11 is D2.

Figure 7B:
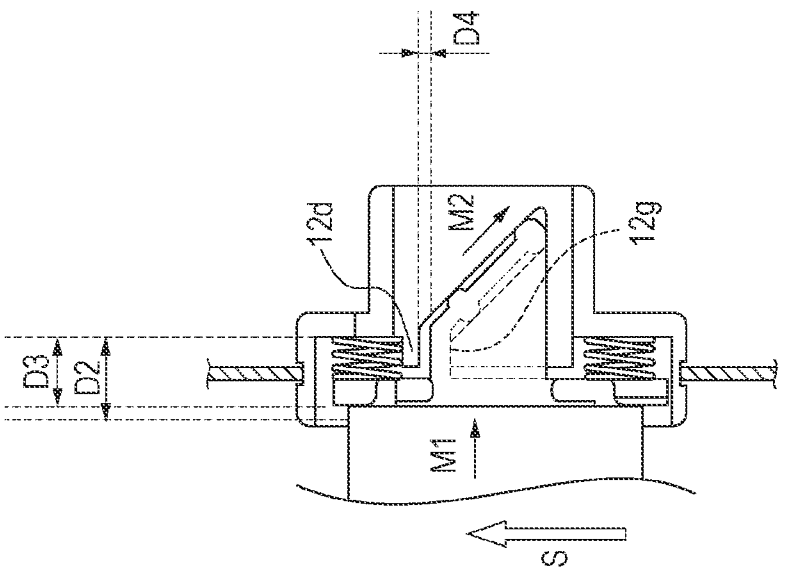
FIGS. 7A and 7B are each an explanatory view of the operation of the correcting mechanism.
Figure 7A:
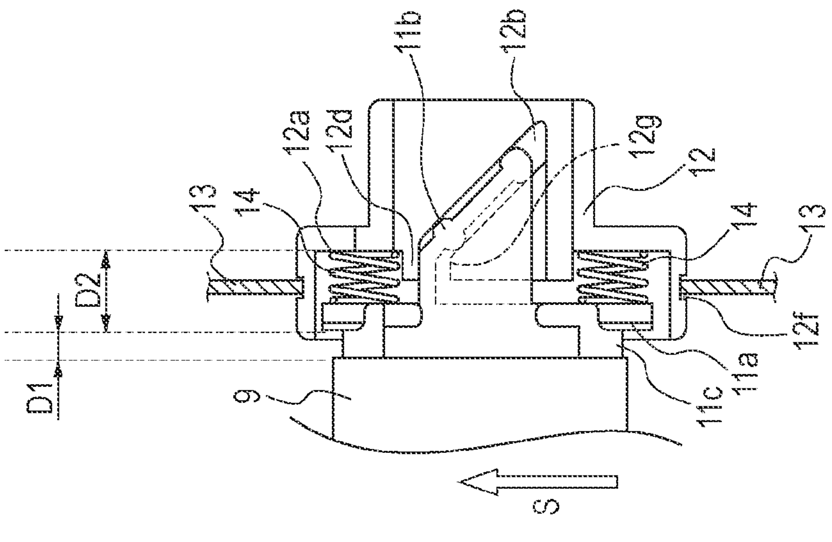

FIG. 7B illustrates a state in which the end surface of the belt 9 contacts the end-surface opposing portion 11*a* as a result of lateral shift of the belt 9 in the direction of arrow M1 and the belt 9 pushes the movable member 11 in the direction of arrow M1 against the urging force of the springs 14.

When, for example, the belt 9 is laterally shifted towards the movable member 11 as a result of, for example, the roller 3 and the belt 9 being out of alignment with each other, the end surface of the belt 9 comes into contact with the movable member 11. When the belt 9 is laterally shifted further, the belt 9 pushes the movable member in the direction of arrow M1 against the urging force of the springs 14, so that the movable member 11 moves. Since the protrusion 11*b* of the movable member 11 moves along the recess 12*b* of the holding member 12, the movable member 11 moves in the direction of arrow M2. When the protrusion 11*b* collides with a second stopper 12*g* of the recess 12*b*, the movable member 11 stops moving. As this time, as shown in FIG. 7B, the distance from the seating surface 12*a* of the holding member 12 to the end-surface opposing portion 11*a* of the movable member 11 is D3 (<D2). Compared to the state in FIG. 7A, the movable member 11 is moved through a distance D4 towards an upstream side in the recording material conveying direction S.

As mentioned above, when the belt 9 is rotating, the inner surface of the belt 9 is in contact with the inner-surface opposing portion 11*c* of the movable member 11. Therefore, when, as shown in FIG. 7B, the movable member 11 is moved towards the upstream side in the recording material conveying direction S, the inner-surface opposing portion 11*c* pushes the inner surface of the belt 9, so that the end portion of the belt at the side of the correcting mechanism 10R moves towards the upstream side in the recording material conveying direction S. In contrast, since the correcting mechanism 10L that is positioned opposite to the correcting mechanism 10R in the longitudinal direction of the heater is not pushed by an end surface of the belt 9, the movable member of the correcting mechanism 10L does not move.

When the movement direction of lateral shift of the belt 9 is in the opposite direction, that is, when the belt collides with the correcting mechanism 10L, only the movable member in the correcting mechanism 10L moves towards the upstream side in the recording material conveying direction S. This movement causes the end portion of the belt at the side of the correcting mechanism 10L to move towards the upstream side in the recording material conveying direction S.

In this way, when the belt 9 is laterally shifted in the longitudinal direction of the heater (that is, the generatrix direction of the belt), and collides with one of the correcting mechanisms 10R and 10L, only the end portion of the belt 9 on the downstream side in a lateral shift direction receives a force towards the upstream side in the recording material conveying direction. Due to this principle, the state of alignment of the belt 9 with respect to the roller 3 is changed, the orientation of the belt is corrected, and the belt moves away from the movable member (that is, in a direction opposite to the direction of arrow M1 shown in FIG. 7B), so that the force that is applied to the end surface of the belt 9 is restricted. This makes it possible to restrict breakage of the belt. As mentioned above, the movable member 11 is urged by the springs 14. Therefore, when the belt 9 moves in a direction opposite to the direction of arrow M1 from the state shown in FIG. 7B, the movable member 11 is pushed back to the position shown in FIG. 7A or to a position between the positions shown in FIGS. 7A and 7B.

Figure 8A:
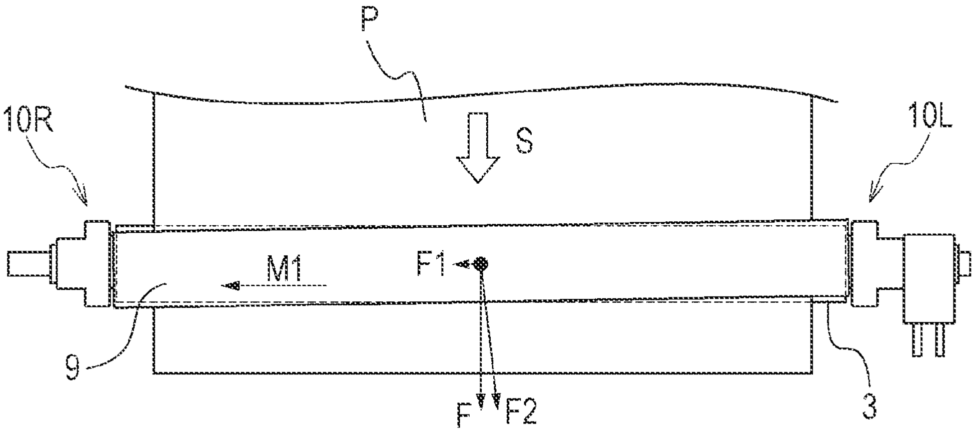
FIGS. 8A and 8B each illustrate a force that is applied to a belt.
Figure 8B:
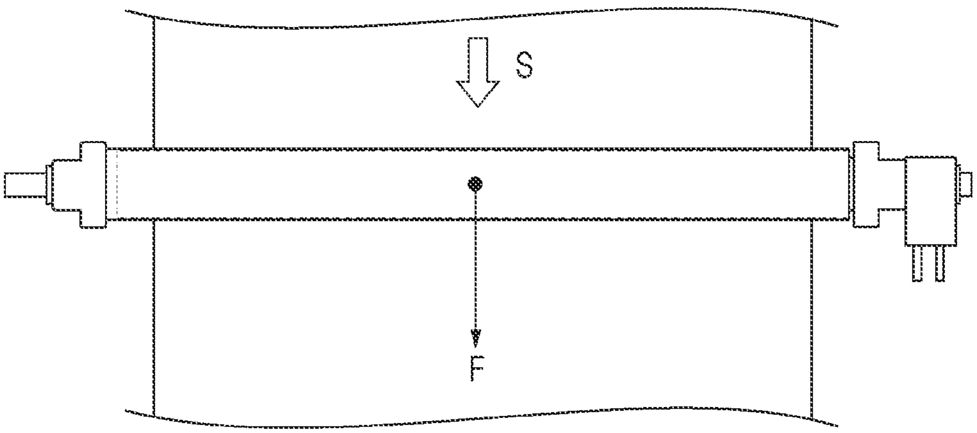

Next, the principle of reducing stress that is applied to the end surfaces of the belt 9 is further described with reference to FIGS. 8A and 8B. FIGS. 8A and 8B each illustrate the heating unit 2 and the roller 3 when seen from the side of the belt 9. FIG. 8A illustrates a state in which the belt is laterally shifted. FIG. 8B illustrates a state in which the belt is no longer laterally shifted.

In general, lateral shift of the belt 9 in the generatrix direction is caused by the roller 3 and the belt 9 being out of alignment with each other. FIG. 8A illustrates a state in which the roller 3 and the belt 9 are out of alignment with each other. That is, FIG. 8A illustrates a state in which the end portion of the belt at the side of the correcting mechanism 10R is inclined towards the downstream side in the recording material conveying direction S and in which the end portion of the belt at the side of the correcting mechanism 10L is inclined towards the upstream side in the recording material conveying direction S. As shown in FIG. 8A, a force F is applied to the belt 9 due to the rotation of the roller 3. The force F can be broken down into a force F1 in the generatrix direction of the belt 9 and a force F2 in a direction that is orthogonal to the generatrix direction. The belt 9 is laterally shifted towards the correcting mechanism 10R by the force F1. When the belt 9 contacts and pushes the movable member 11 of the correcting mechanism 10R, the movable member 11 is guided to the holding member 12 and moves towards the upstream side in the recording material conveying direction S. The movement of the movable member 11 corrects the orientation of the belt 9 as shown in FIG. 8B on the basis of the aforementioned principle. Since the roller 3 and the belt 9 are no longer out of alignment, the angle between the force F and the generatrix direction of the belt 9 is changed. As a result, the force F1 is reduced, so that stress that is applied to the end surface of the belt 9 is also reduced.

Figure 9:
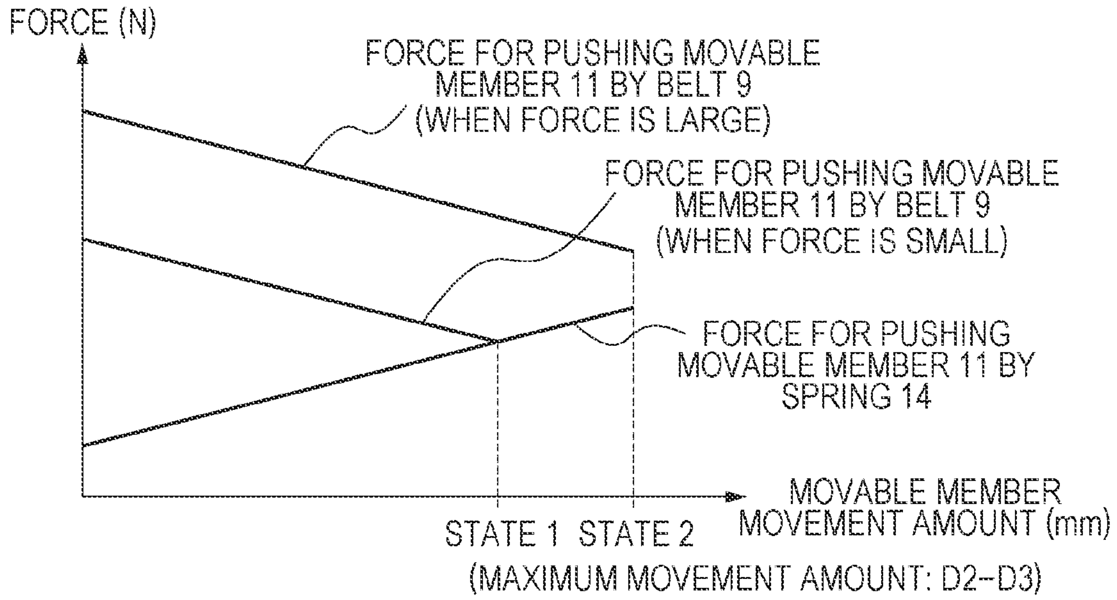
FIG. 9 illustrates a force that is applied to the movable member.

The magnitude of the force F1 changes in accordance with the movement amount of the movable member 11. FIG. 9 illustrates the relationship between a force for pushing the movable member 11 by the belt 9 and a force for pushing the movable member 11 by the springs 14 in accordance with the movement amount of the movable member 11 in the longitudinal direction of the heater. As shown in FIG. 9, when the belt 9 starts pushing the movable member 11, one of the end portions of the belt is pushed by the inner-surface opposing portion 11*c* of the movable member, so that they gradually become aligned. That is, since the movement amount of the movable member towards the upstream side in the recording material conveying direction is increased as the movement amount of the movable member is increased, the amount of correction of the orientation (inclination) of the belt is increased, so that the force F1 is reduced. When the movement amount of the movable member is increased, the force for pushing the movable member 11 by the springs 14 is gradually increased. If the force when the belt 9 starts pushing the movable member 11 is small, that is, if the force F1 is small, the movable member 11 stops at a position where the force F1 and the force of the springs 14 are in equilibrium before a maximum movement amount (D2–D3) is reached (state 1). If the force when the belt 9 starts pushing the movable member 11 is large, that is, when the force F1 is large, the maximum movement amount (D2–D3) is reached before the force F1 and the force of the springs 14 are in equilibrium, and the movable member 11 stops at the position where the maximum movement amount is reached (state 2). A clearance is provided between the inner surface of the belt and the inner-surface opposing portion 11*c* so that the state of contact between the inner-surface opposing portion 11*c* and the inner surface of the belt is maintained even in the state in which the movable member 11 has moved by the maximum movement amount (D2–D3). That is, a clearance is provided between the inner surface of the belt and the inner-surface opposing portion 11*c* so that the state of contact between the inner-surface opposing portion 11*c* and the inner surface of the belt is maintained even in the state in which the movable member 11 has moved upstream in the recording material conveying direction through a distance D4.

As mentioned above, since it is possible to reduce stress that is applied to the end surfaces of the belt 9, it is possible to suppress wear of the end surfaces of the belt 9.

Although, in the embodiment, correcting mechanisms are provided at both opposing ends of the belt, the aforementioned correcting mechanism may be provided only at a side towards which the belt is laterally shifted, with the direction in which the belt is laterally shifted being previously set in one direction. In addition, in the embodiment, the length of the belt is assumed as being less than the span between the two movable members. However, the length of the belt may be about the same as the space between the two movable members, that is, the two ends of the belt may be constantly in contact with the two movable members. Further, although a structure in which the inner-surface opposing portion and the end-surface opposing portion are formed as one part serving as a movable member is described, the inner-surface opposing portion and the end-surface opposing portion may be separate parts. This applies to the other embodiments described below.

Second Embodiment

Figure 10A:
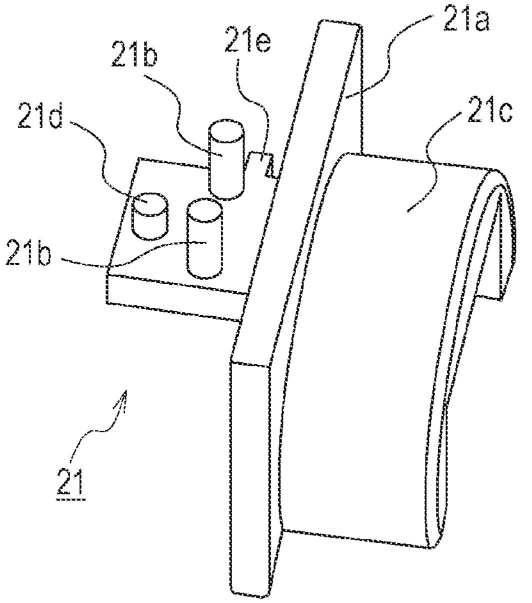
FIGS. 10A and 10B are a perspective view of a movable member and a perspective view of a holding member according to a second embodiment, respectively.
Figure 10B:
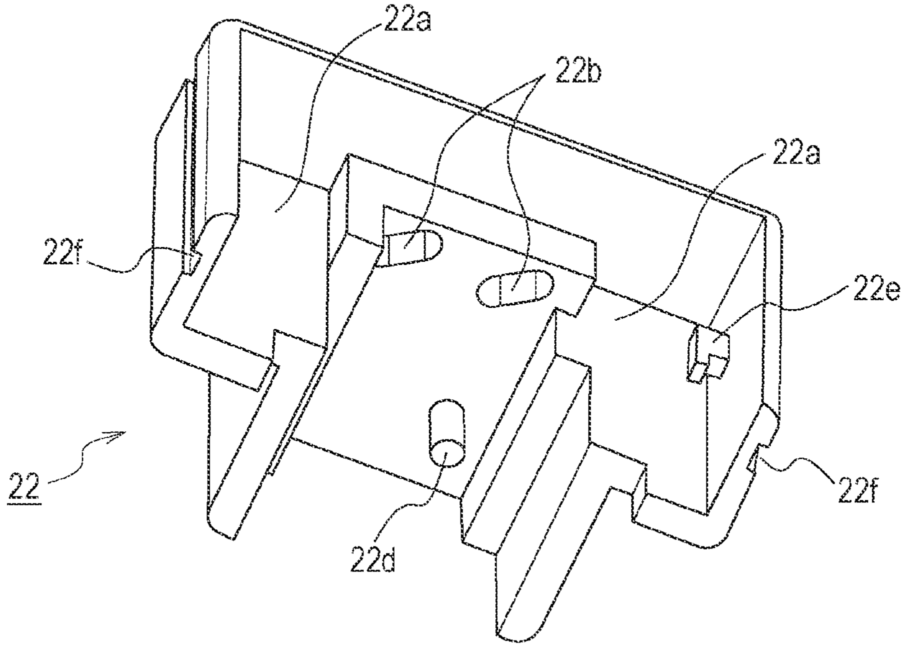
Figure 11:
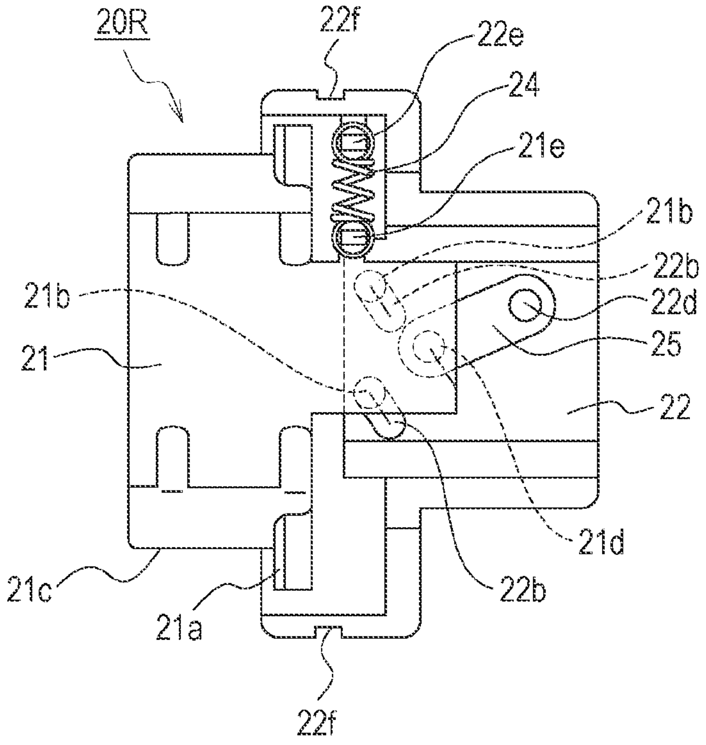
FIG. 11 is a sectional view of a correcting mechanism.
Figure 12B:
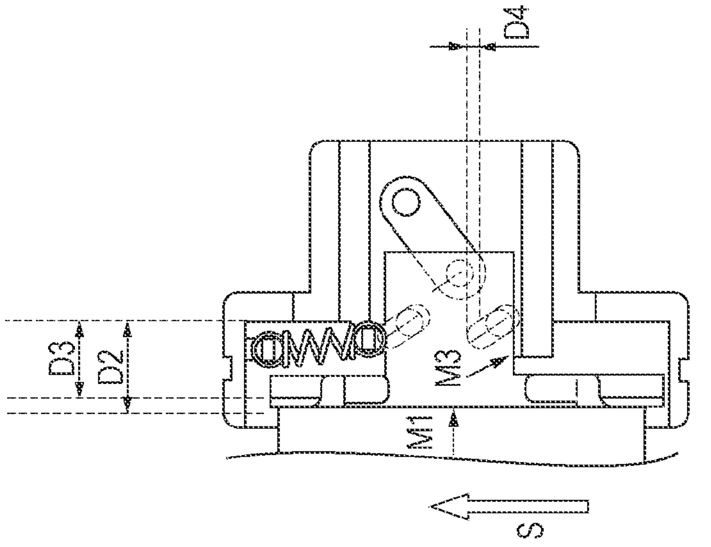
FIGS. 12A and 12B are each an explanatory view of the operation of the correcting mechanism.
Figure 12A:
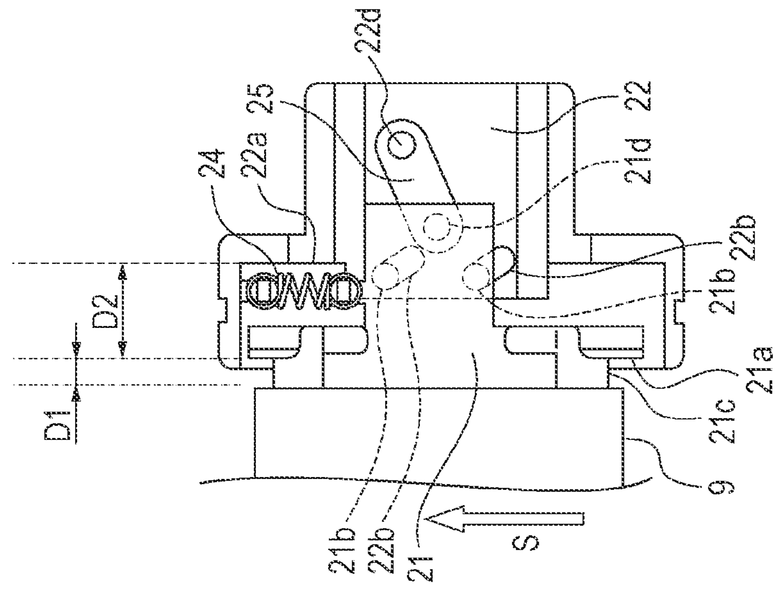

Next, a fixing device according to a second embodiment is described while focusing on the differences from the first embodiment. FIG. 10A is a perspective view of a movable member 21. FIG. 10B is a perspective view of a holding member 22 that holds the movable member 21. Further, FIG. 11 illustrates a correcting mechanism 20R, which is one of the two correcting mechanisms, when seen from a direction that is the same as the direction of arrow VI shown in FIG. 4B. FIGS. 12A and 12B each illustrate a mechanism for correcting the orientation of a belt 9 by the correcting mechanism 20R.

The correcting mechanism 20R includes a movable member 21, a holding member 22 that holds the movable member 21, an extension spring 24 that urges the movable member 21, and a link member 25.

The movable member 21 includes an end-surface opposing portion 21*a*, protrusions 21*b*, and an inner-surface opposing portion 21*c*. The end-surface opposing portion 21*a* collides with an end surface of the belt when the belt 9 is laterally shifted. The inner-surface opposing portion 21*c* opposes an inner surface of the belt in a generatrix direction thereof. Further, the movable member 21 includes a protrusion 21*d* and a supporting portion 21*e* of the extension spring 24. The protrusion 21*d* rotatably holds the link member 25 (described later).

The holding member 22 that holds the movable member 21 has a surface 22*a* and recesses 22*b*. The surface 22*a* is substantially parallel to the end-surface opposing portion 21*a* of the movable member 21. The recesses 22*b* guide the protrusions 21*b* of the movable member 21. The holding member 22 further has a protrusion 22*d*, a supporting portion 22*e* of the extension spring 24, and grooves 22*f*. The protrusion 22*d* serves as a rotational center of the link member 25. The grooves 22*f* are provided for fitting the holding member 22 to a U-shaped recess of a device frame 13. The link member 25 is mounted so as to link the protrusion 21*d* and the protrusion 22*d*.

Next, the operation of the correcting mechanism 20R is described. As shown in FIG. 12A, when an end surface of the belt 9 is not in contact with the end-surface opposing portion 21*a*, the distance between the end surface of the belt 9 and the end-surface opposing portion 21*a* of the movable member 21 is D1. The distance from the surface 22*a* of the holding member 22 to the end-surface opposing portion 21*a* of the movable member 21 is D2.

FIG. 12B illustrates a state in which the end surface of the belt 9 contacts the end-surface opposing portion 21*a* as a result of lateral shift of the belt 9 in the direction of arrow M1 and the belt 9 pushes the movable member 21 in the direction of arrow M1 against the urging force of the spring 24. When the belt 9 pushes the movable member 21, the protrusions 21*b* move in the direction of arrow M3 while being guided by the recesses 22*b*. During this movement, the link member 25 rotates around the protrusion 22*d*. By the action of the link member 25, the movable member 21 moves parallel to the direction of arrow M3 without changing its orientation from the state shown in FIG. 12A. Then, when the protrusions 21*b* have moved to end portions of the recesses 22*b*, the movable member 21 stops moving. At this time, as shown in FIG. 12B, the distance from the surface 22*a* of the holding member 22 to the end-surface opposing portion 21*a* of the movable member 21 is D3 (<D2). Compared to the state shown in FIG. 12A, the movable member 21 is moved through a distance D4 towards an upstream side in a recording material conveying direction S.

When the movable member 21 moves towards the upstream side in the recording material conveying direction S, the inner-surface opposing portion 21*c* pushes the inner surface of the belt 9, as a result of which the end portion of the belt at the side of the correcting mechanism 20R moves towards the upstream side in the recording material conveying direction S. In contrast, since a correcting mechanism 20L (not shown) that is positioned opposite to the correcting mechanism 20R in the longitudinal direction of a heater is not pushed by an end surface of the belt 9, the movable member of the correcting mechanism 20L does not move.

As described above, when the movable member moves, the alignment of the belt 9 changes with respect to the roller 3 on the basis of a principle that is the same as that used in the first embodiment, and the orientation of the belt is corrected. This causes the belt to move away from the movable member (that is, in a direction opposite to the direction of arrow M1 shown in FIG. 12B), so that the force that is applied to the end surface of the belt 9 is restricted. This makes it possible to restrict breakage of the belt.

Third Embodiment

Figure 13:
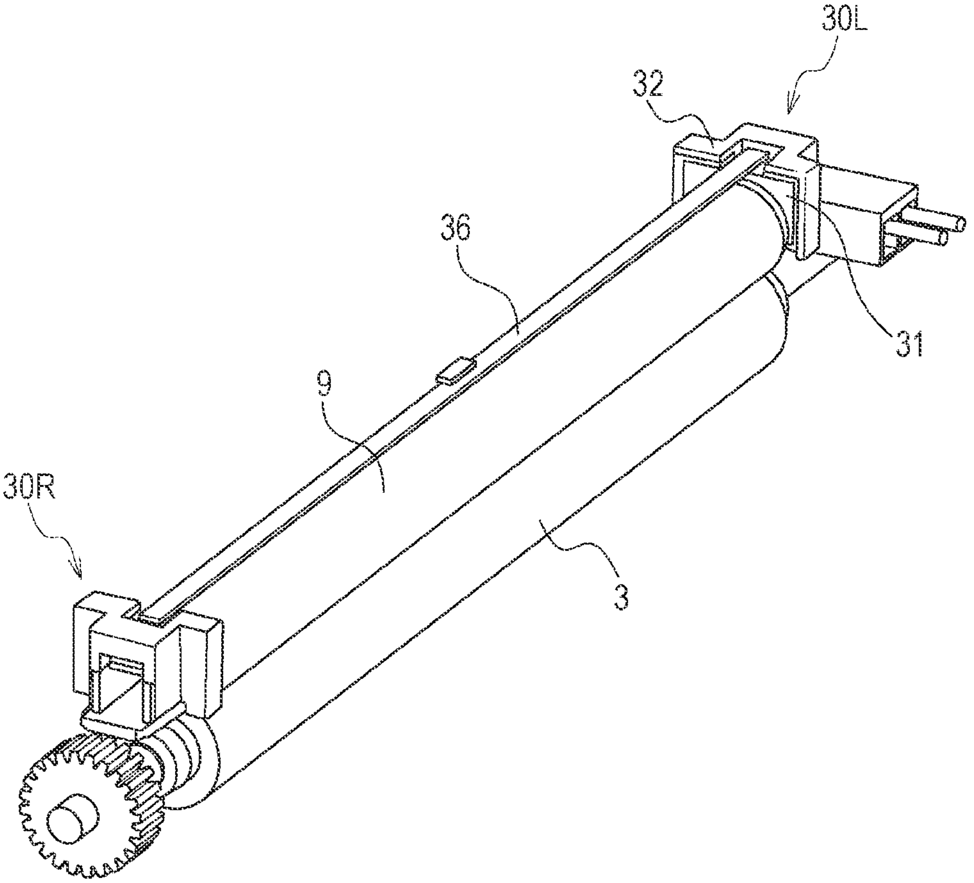
FIG. 13 is a perspective view of a fixing device according to a third embodiment.
Figure 14A:
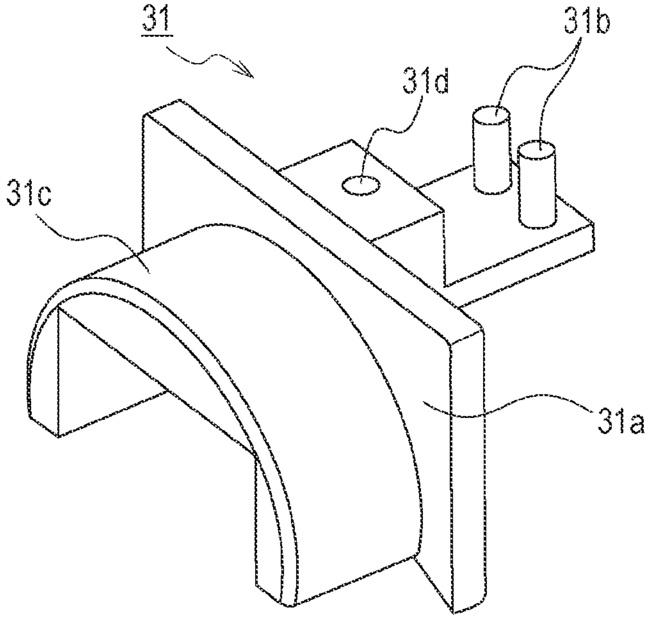
FIGS. 14A and 14B are a perspective view of a movable member and a perspective view of a holding member, respectively.
Figure 14B:
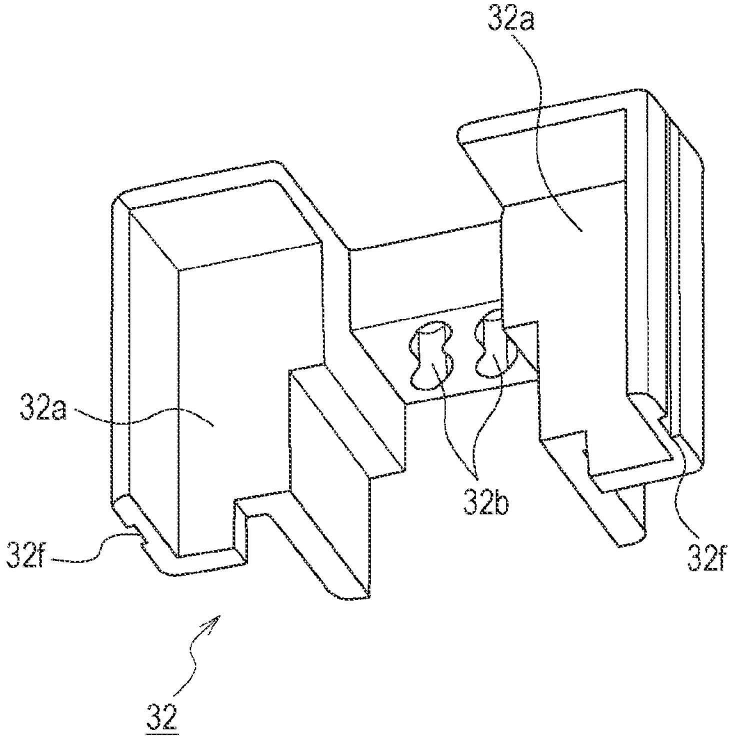
Figure 15A:
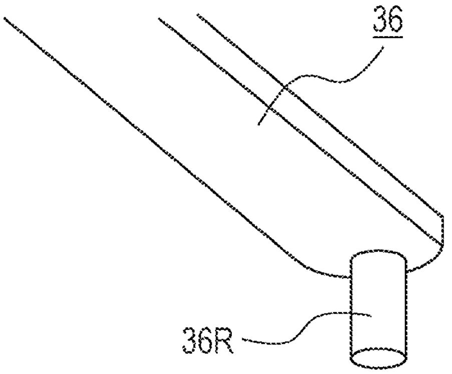
FIG. 15A is a perspective view of a link member and FIG. 15B is a sectional view of a correcting mechanism.
Figure 15B:
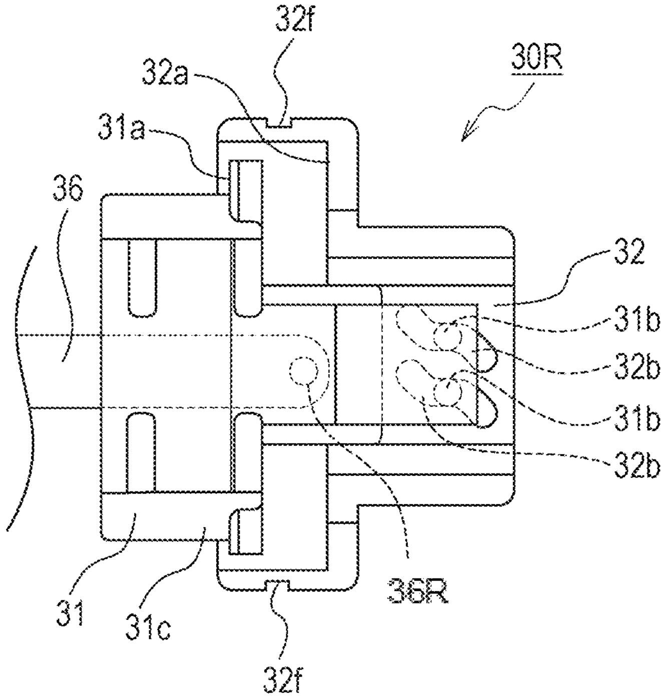
Figure 16A:
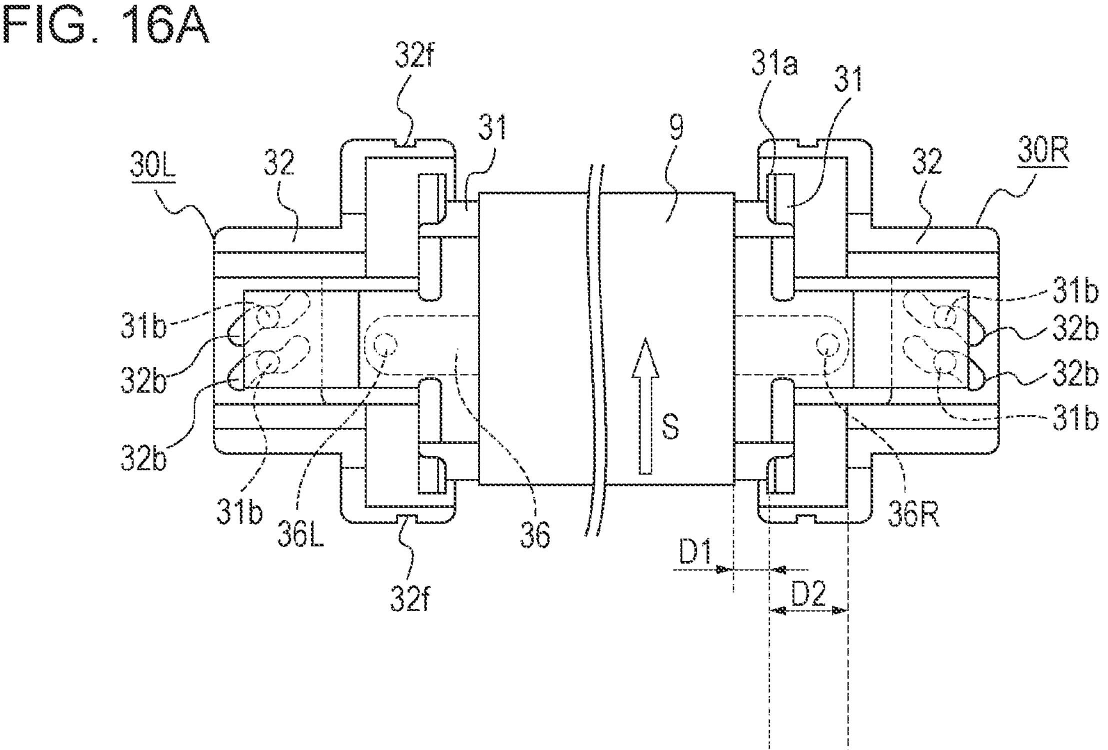
FIGS. 16A and 16B are each an explanatory view of the operation of the correcting mechanism.
Figure 16B:
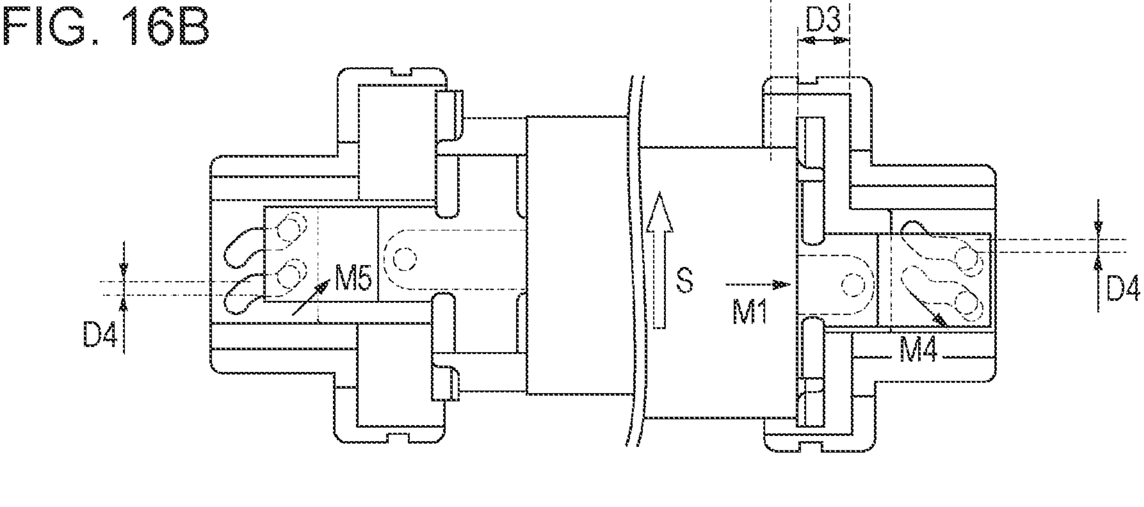

Next, a fixing device according to a third embodiment is described while focusing on the differences from the first and second embodiments. FIG. 13 is a perspective view of the fixing device. FIG. 14A is a perspective view of a movable member 31. FIG. 14B is a perspective view of a holding member 32 that holds the movable member 31. Further, FIG. 15A is a perspective view of an end portion of a link member 36 (described later). FIG. 15B illustrates a correcting mechanism 30R, which is one of the two correcting mechanisms, when seen from a direction that is the same as the direction of arrow VI shown in FIG. 4B. FIGS. 16A and 16B each illustrate a mechanism for correcting the orientation of a belt 9 by the correcting mechanisms 30R and 30L.

The correcting mechanisms 30R and 30L each include a movable member 31 and a holding member 32 that holds the movable member 31. A link member 36 that links the two movable members 31 is provided at the correcting mechanisms 30R and 30L.

Each movable member 31 includes an end-surface opposing portion 31*a*, protrusions 31*b*, and an inner-surface opposing portion 31*c*. Each end-surface opposing portion 31*a* collides with an end surface of the belt when the belt 9 is laterally shifted. Each inner-surface opposing portion 31*c* opposes an inner surface of the belt in a generatrix direction thereof. Further, each movable member 31 has a hole 31*d* for rotatably holding the link member 36 (described later).

Each holding member 32 that holds the corresponding movable member 31 has a surface 32*a* and recesses 32*b*. Each surface 32*a* is substantially parallel to the end-surface opposing portion 31*a* of the corresponding movable member 31. Each recess 32*b* guides the corresponding protrusion 31*b* of the movable member 31. Each holding member 32 further has a groove 32*f* for fitting the corresponding holding member 32 to a U-shaped recess of a device frame 13.

The device according to the third embodiment includes the link member 36 that links the movable member of the correcting mechanism 30R and the movable member of the correcting mechanism 30L. The link member 36 includes a shaft 36R that is inserted into the hole 31*d* of the movable member of the correcting mechanism 30R and a shaft 36L that is inserted into the hole 31*d* of the movable member of the correcting mechanism 30L.

Next, the operation of the correcting mechanism 30R and the correcting mechanism 30L is described. As shown in FIG. 16A, when end surfaces of the belt 9 are not in contact with the end-surface opposing portions 31*a*, the distance between each end surface of the belt 9 and the end-surface opposing portion 31*a* of its corresponding movable member 31 is D1. The distance from the surface 32*a* of each holding member 32 to the end-surface opposing portion 31*a* of its corresponding movable member 31 is D2.

FIG. 16B illustrates a state in which an end surface of the belt 9 contacts the end-surface opposing portion 31*a* of the movable member of the correcting mechanism 30R as a result of lateral shift of the belt 9 in the direction of arrow M1 and the belt 9 pushes the movable member 31 in the direction of arrow M1. When the belt 9 pushes the movable member 31, the movable member of the correcting mechanism 30R moves in the direction of arrow M4 while the protrusions 31*b* are guided by the recesses 32*b*. The movable member of the correcting mechanism 30L and the movable member of the correcting mechanism 30R are linked by the link member 36. The two movable members move with each other's movement. Therefore, when the movable member of the correcting mechanism 30R moves in the direction of arrow M4, the movable member of the correcting mechanism 30L moves in the direction of arrow M5. That is, when the movable member of the correcting mechanism 30R moves upstream in a recording material conveying direction, the movable member of the correcting mechanism 30L moves downstream in the recording material conveying direction.

In FIG. 16B, a distance D3 is a distance from the surface 32*a* to the end-surface opposing portion 31*a* when the protrusions 31*b* have moved to end portions of the recesses 32*b*. At this time, the movement distances of the two movable members in the recording material conveying direction are both D4. When the belt 9 is laterally shifted towards the correcting mechanism 30L, the movement directions of the two movable members in the recording material conveying direction are opposite to the directions shown in FIG. 16B.

By virtue of the above-described structure, compared to the structure in which only one of the movable members is moved, the inclination of the belt 9 in the direction of correction of the lateral shift of the belt is increased, so that the ability to correct the lateral shift of the belt is increased.

Fourth Embodiment

Next, a fixing device according to a fourth embodiment is described while focusing on the differences from the first embodiment to the third embodiment.

A correcting mechanism according to the fourth embodiment includes a sensor 46 that detects lateral shift of a belt 9, and moves a movable member upstream in a recording material conveying direction by power of a motor (driving section) that is in accordance with an output of the sensor 46.

Figure 17A:
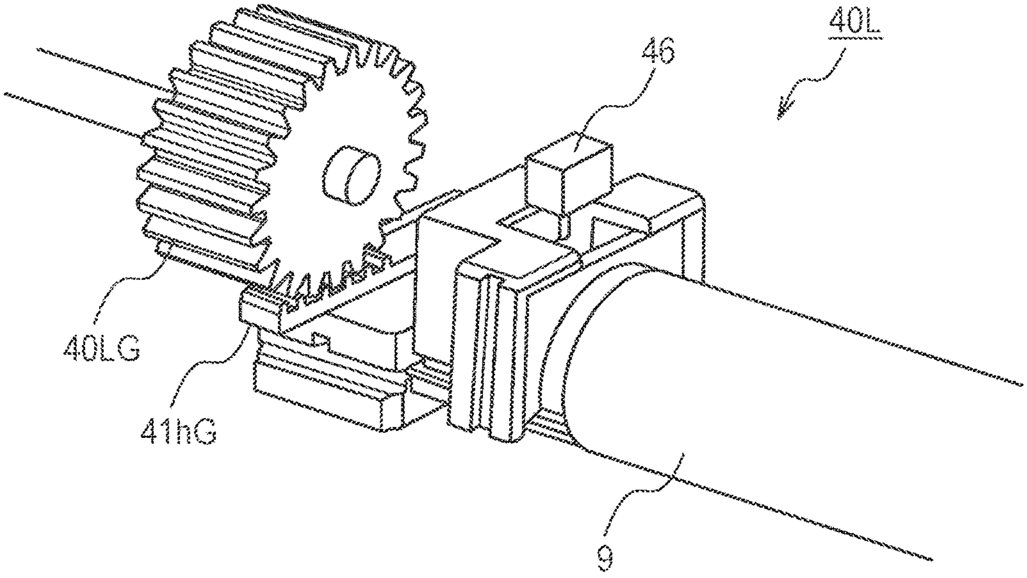
FIGS. 17A and 17B are, respectively, a perspective view and a top view of a correcting mechanism according to a fourth embodiment.
Figure 17B:
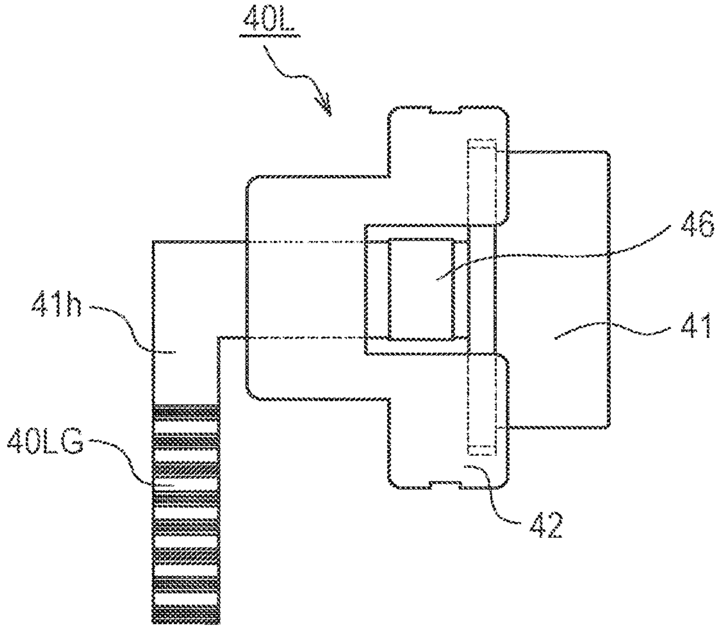
Figure 18A:
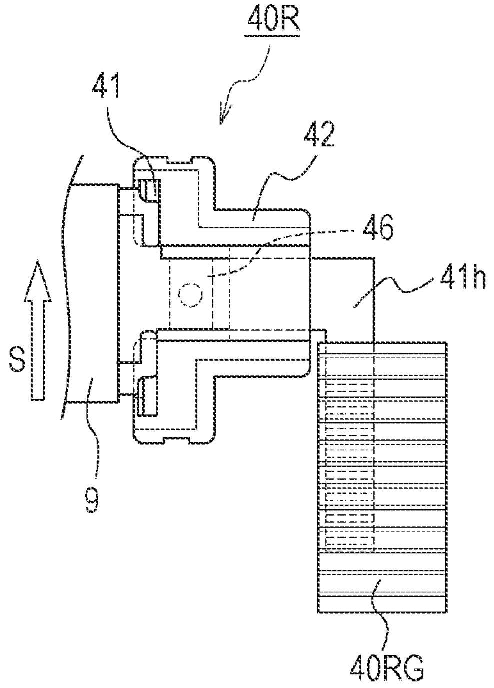
FIGS. 18A and 18B are each an explanatory view of the operation of the correcting mechanism.
Figure 18B:
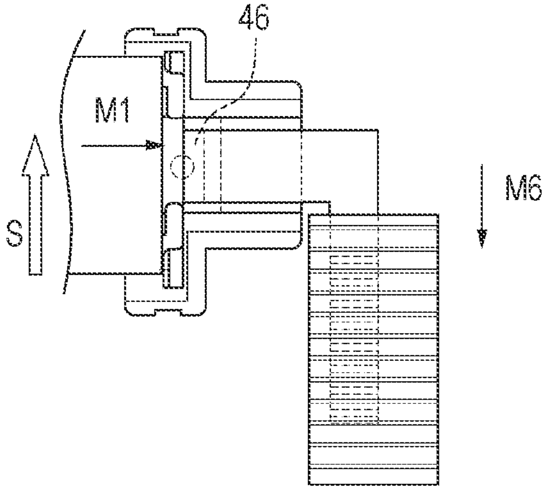

FIG. 17A is a perspective view of a correcting mechanism 40L. FIG. 17B illustrates the correcting mechanism 40L when seen from above the correcting mechanism 40L. A correcting mechanism 40R that is disposed at the opposite side also has the same structure. FIGS. 18A and 18B illustrate the operation of the correcting mechanism.

The photosensor 46 is disposed above the movable member 41. The sensor 46 detects the movement of the movable member 41 in a generatrix direction of the belt. When the belt 9 is not in contact with the movable member 41 and the movable member is not moving, the movable member 41 is at a position shown in FIG. 18A, and reflection light from a light source provided at the sensor 46 is not reflected by the sensor. However, when the movable member 41 moves in the generatrix direction of the belt by the lateral shift of the belt 9, the movable member 41 moves to the position shown in FIG. 18B, and the reflection light from the light source is detected by the sensor 46. In accordance with this output, a motor (not shown) rotates a gear 40RG that engages with a gear 41*h*G provided at a rack 41*h* of the movable member 41, to move the movable member 41 in the direction of arrow M6, that is, upstream in the recording material conveying direction.

This causes the alignment of the belt 9 with respect to the roller 3 to change on the basis of a principle that is the same as that used in the first embodiment, and the orientation of the belt is corrected. This causes the belt to move away from the movable member, so that the force that is applied to the end surface of the belt 9 is restricted.

In the fourth embodiment, the movable member may be moved in the direction of arrow M6 before the end surface of the belt comes into contact with the end-surface opposing portion of the movable member.

Fifth Embodiment

Next, a fixing device according to a fifth embodiment is described while focusing on the differences from the first embodiment to the fourth embodiment.

Figure 19:
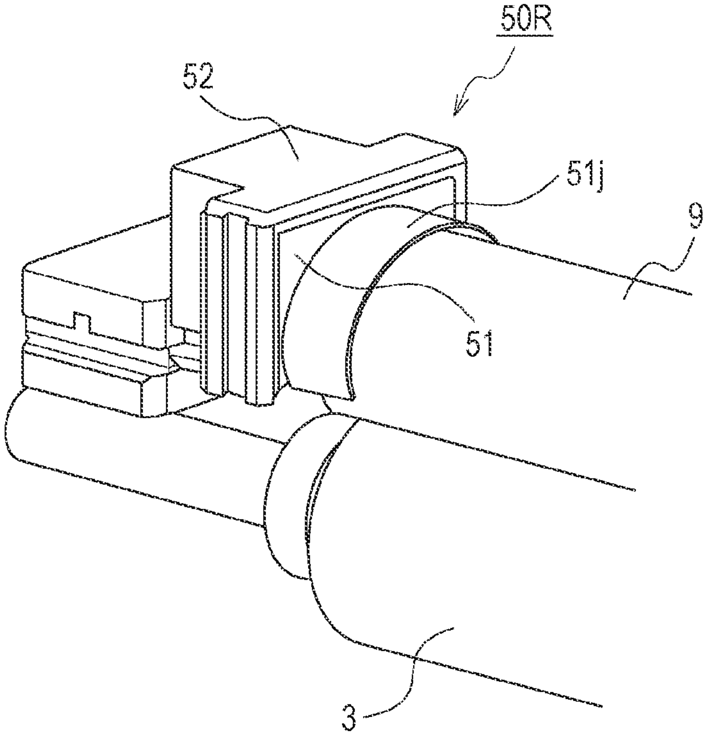
FIG. 19 is a perspective view of a correcting mechanism according to a fifth embodiment.

A movable member according to the fifth embodiment differs from those of the other embodiments in that a portion thereof that pushes a belt upstream in a recording material conveying direction for correcting the orientation of the belt opposes an outer surface of the belt. FIG. 19 is a perspective view of a correcting mechanism 50R of the device according to the fifth embodiment. The correcting mechanism 50R includes a movable member 51 and a holding member 52. The movable member 51 includes an outer-surface opposing portion 51*j* that opposes the outer surface of an end portion of the belt. When the belt is laterally shifted and pushes the movable member, the outer-surface opposing portion 51*j* of the movable member urges the end portion of the belt towards an upstream side in the recording material conveying direction using a force resulting from the pushing. This causes the alignment of the belt 9 with respect to the roller 3 to change on the basis of a principle that is the same as that used in the first embodiment, and the orientation of the belt is corrected. This causes the belt to move away from the movable member, so that the force that is applied to the end surface of the belt 9 is restricted.

Sixth Embodiment

Next, correcting mechanisms 110R and 110L that correct the inclination of a belt 9 according to a sixth embodiment are described with reference to FIGS. 20A to 24D. The shape of the correcting mechanism 110R and the shape of the correcting mechanism 110L are substantially axially symmetrical with reference to a conveyance reference X of a recording material P. Therefore, the correcting mechanisms 110R and 110L are described by primarily describing the correcting mechanism 110R and partly describing the correcting mechanism 110L.

Figure 20A:
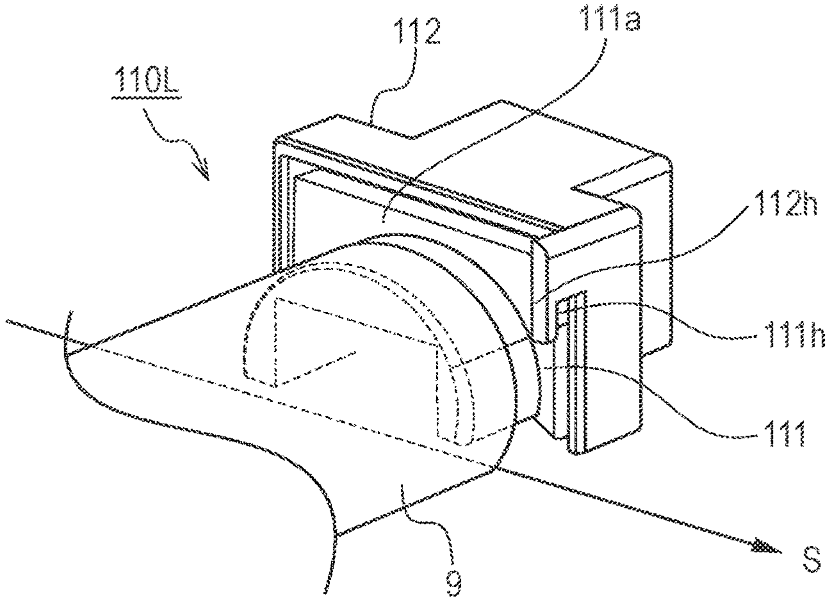
FIGS. 20A and 20B are, respectively, a perspective view and a sectional view of a correcting mechanism according to a sixth embodiment.
Figure 20B:
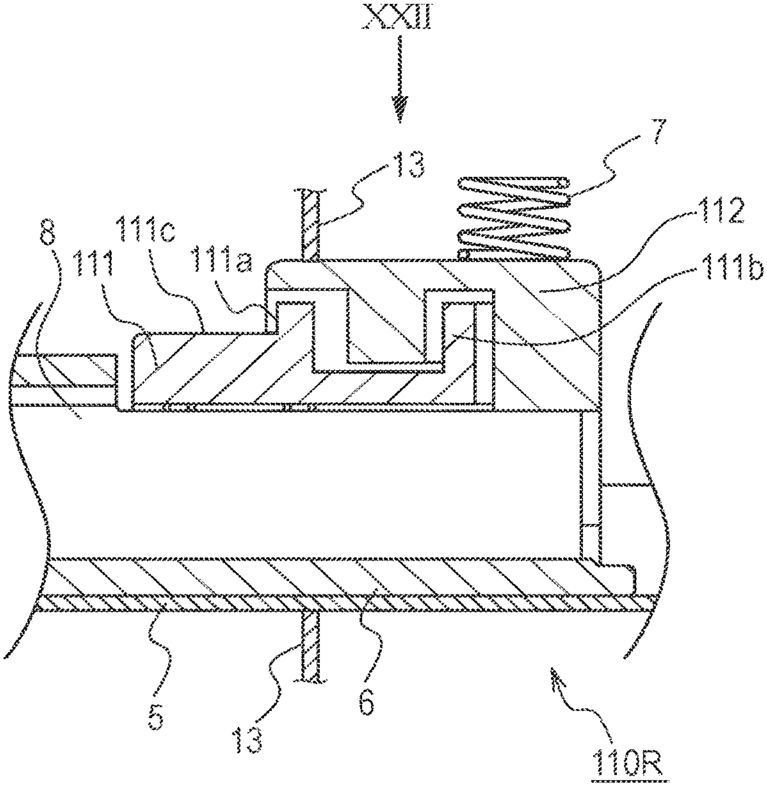
Figure 21A:
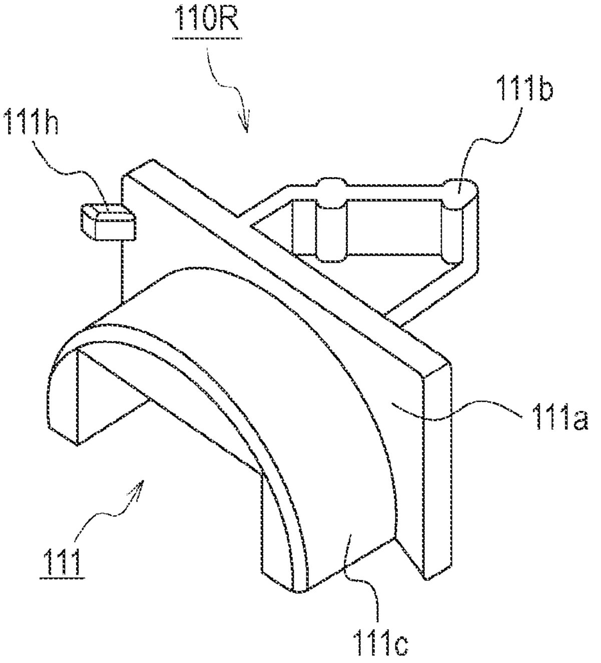
FIGS. 21A and 21B are a perspective view of a movable member and a perspective view of a holding member, respectively.
Figure 21B:
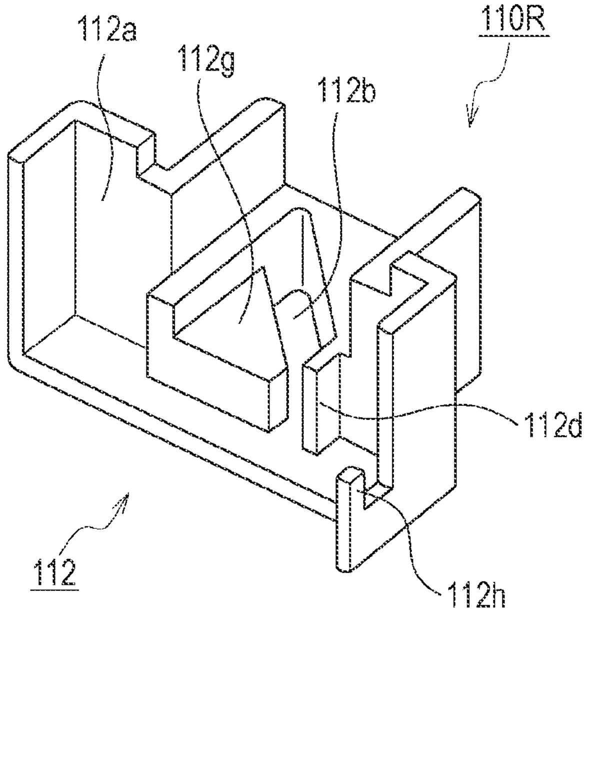
Figure 22:
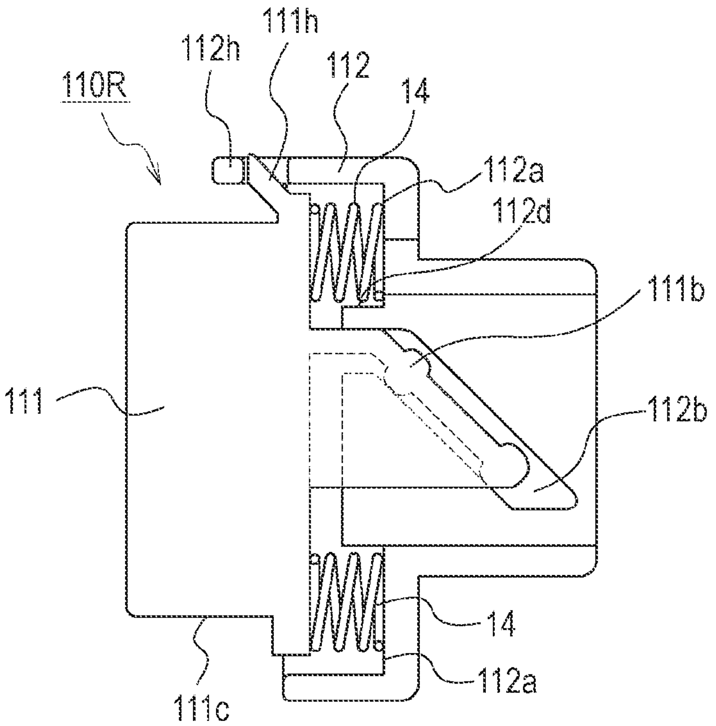
FIG. 22 is a sectional view of the correcting mechanism.

FIG. 20A is a perspective view of the correcting mechanism 110L. FIG. 20B is a sectional view of the correcting mechanism 110R when seen from an upstream side in a recording material conveying direction. FIG. 21A is a perspective view of a movable member 111 (described below). FIG. 21B is a perspective view of a holding member 112 that holds the movable member 111. Further, FIG. 22 illustrates the correcting mechanism 110R when seen from the direction of arrow XXII in FIG. 20B. FIGS. 23A and 23B and FIGS. 24A to 24D each illustrate a mechanism that corrects the orientation of the belt by the correcting mechanisms.

The correcting mechanism 110R includes a movable member 111, a holding member 112 that holds the movable member 111, and compression springs (urging members) 14 that urge the movable member 111. As described above, the holding member 112 is fitted to a U-shaped recess of a frame 13 of a fixing device. This causes the position of the holding member 112 in a longitudinal direction of a heater and the position of the holding member 112 in the recording material conveying direction to be substantially determined. Since the holding member 112 is urged towards a roller 3 by a spring 7, the holding member 112 is in a substantially secured state.

The movable member 111 is a part that is movably engaged with the holding member 112. The movable member 111 is in contact with a cutaway portion provided at an end portion of a stay 8 in a longitudinal direction. A slight gap is provided between the holding member 112 and a top portion of the movable member 111. As shown in FIG. 20A, the movable member 111 has an end-surface opposing portion 111*a* that opposes an end surface of the belt 9. When the belt 9 is laterally shifted in a generatrix direction thereof, the end surface of the belt 9 collides with the end-surface opposing portion 111*a*. The movable member 111 has an inner-surface opposing portion 111*c* that opposes an inner surface of the end portion of the belt 9. A slight clearance is provided between the inner surface of the belt 9 and the inner-surface opposing portion 111*c*. The inner-surface opposing portion 111*c* has the function of guiding the inner surface of the belt 9 when the belt rotates.

As shown in FIG. 21A, the movable member 111 has a protrusion 111*b* extending obliquely with respect to the longitudinal direction of the heater. As shown in FIG. 21B, the holding member 112 has a recess (guide) 112*b* extending obliquely with respect to the longitudinal direction of the heater. When the movable member 111 and the holding member 112 are combined, the protrusion 111*b* of the movable member 111 is fitted in the recess 112*b* of the holding member 112. By virtue of this structure, the movable member 111 is slidably held along the recess 112*b* of the holding member 112. Reference numerals 14 denote the compression springs that urge the movable member 111 away from a seating surface 112*a* of the holding member 112.

Next, the operations of the correcting mechanisms 110 are described with reference to FIGS. 22 to 24D. FIGS. 22 and 23A each illustrate a state of the correcting mechanism in which the end surface of the belt 9 is not in contact with the end-surface opposing portion 111*a*. When the belt 9 is rotated by following the rotation of the roller 3, the belt 9 contacts the inner-surface opposing portion 111*c* of the movable member 111 in an area that is disposed upstream of the heater 5 in a rotation direction of the belt. In contrast, in an area that is disposed downstream of the heater 5 in the rotation direction of the belt, the belt 9 is separated from the inner-surface opposing portion 111*c* of the movable member 111.

When the end surface of the belt 9 is not in contact with the end-surface opposing portion 111*a*, the movable member 111 that is urged by the springs 14 is positioned at a location that is farthest from the seating surface 112*a* in the holding member 112. At this time, even if the protrusion 111*b* of the movable member 111 collides with a first stopper 112*d* of the holding member 112 and is urged by the springs 14, the movable member 111 is positioned by restricting the movement of the movable member 111.

As shown in FIG. 23A, when the end surface of the belt 9 is not in contact with the end-surface opposing portion 111*a*, the distance between the end surface of the belt 9 and the end-surface opposing portion 111*a* of the movable member 111 is D1. The distance from the seating surface 112*a* of the holding member 112 to the end-surface opposing portion 111*a* of the movable member 111 is D2.

Figure 23B:
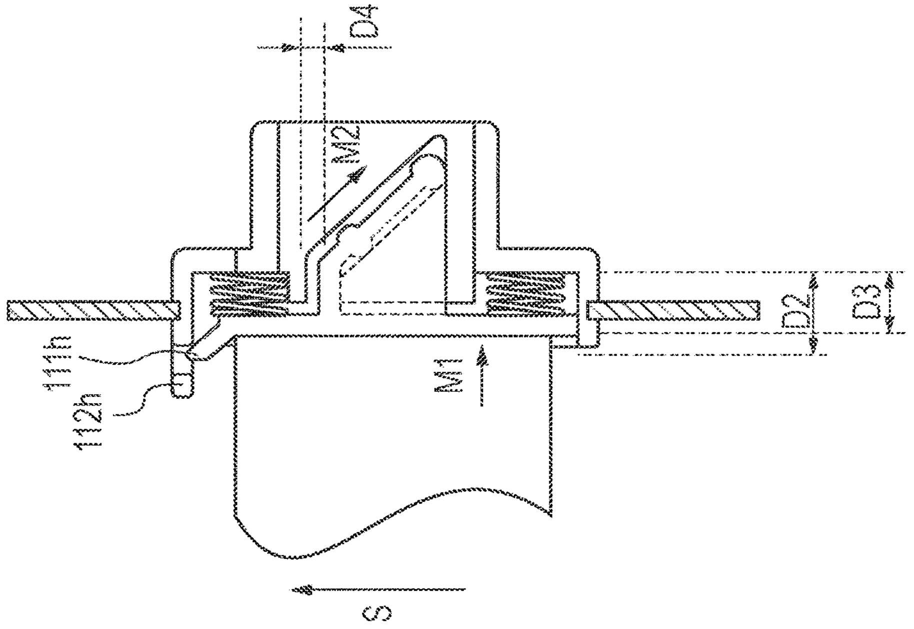
FIGS. 23A and 23B are each an explanatory view of the operation of the correcting mechanism.
Figure 23A:
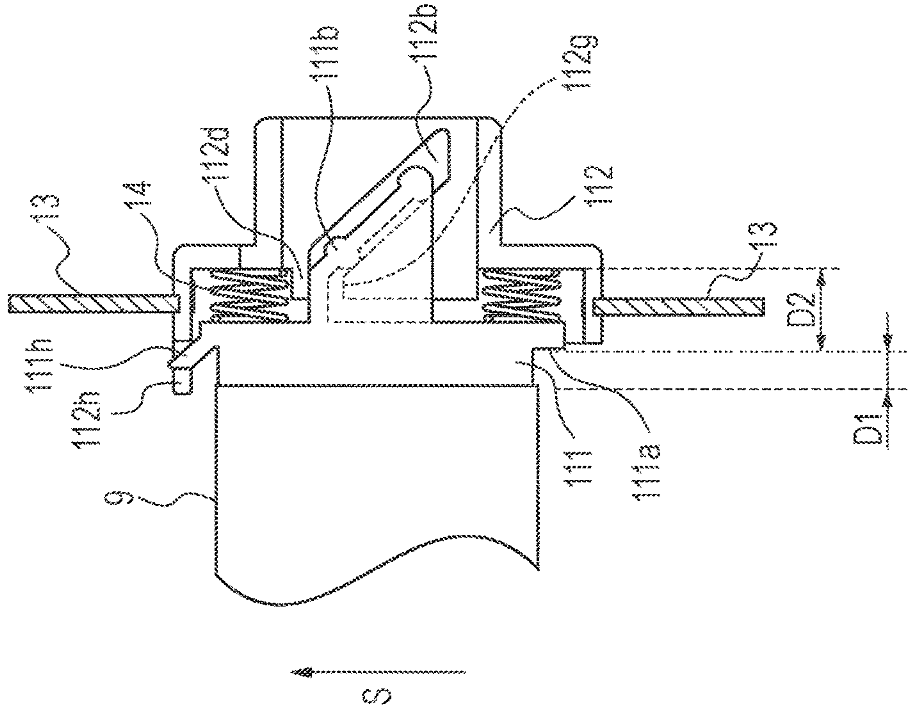

FIG. 23B illustrates a state in which the end surface of the belt 9 contacts the end-surface opposing portion 111*a* as a result of lateral shift of the belt 9 in the direction of arrow M1 and the belt 9 pushes the movable member 111 in the direction of arrow M1 against the urging force of the springs 14.

When, for example, the belt 9 is laterally shifted towards the movable member 111 as a result of, for example, the roller 3 and the belt 9 being out of alignment with each other, the end surface of the belt 9 comes into contact with the movable member 111. When the belt 9 is laterally shifted further, the belt 9 pushes the movable member in the direction of arrow M1 against the urging force of the springs 14, so that the movable member 11 moves by making use of a force of lateral shift of the belt. Since the protrusion 111*b* of the movable member 111 moves along the recess 12*b* of the holding member 112, the movable member 111 moves in the direction of arrow M2. When the protrusion 111*b* collides with a second stopper 112*g* of the recess 112*b*, the movable member 111 stops moving. As this time, as shown in FIG. 23B, the distance from the seating surface 112*a* of the holding member 112 to the end-surface opposing portion 111*a* of the movable member 111 is D3 (<D2). Compared to the state in FIG. 23A, the movable member 111 is moved through a distance D4 towards an upstream side in the recording material conveying direction S.

As mentioned above, when the belt 9 is rotating, the inner surface of the belt 9 is in contact with the inner-surface opposing portion 111*c* of the movable member 111. Therefore, when, as shown in FIG. 23B, the movable member 111 is moved towards the upstream side in the recording material conveying direction S, the inner-surface opposing portion 111*c* pushes the inner surface of the belt 9, so that the end portion of the belt at the side of the correcting mechanism 110R moves towards the upstream side in the recording material conveying direction S. In contrast, since the correcting mechanism 110L that is positioned opposite to the correcting mechanism 110R in the longitudinal direction of the heater is not pushed by an end surface of the belt 9, the movable member of the correcting mechanism 110L does not move.

When the movement direction of lateral shift of the belt 9 is in the opposite direction, that is, when the belt collides with the correcting mechanism 110L, only the movable member in the correcting mechanism 110L moves towards the upstream side in the recording material conveying direction S. This movement causes the end portion of the belt at the side of the correcting mechanism 110L to move towards the upstream side in the recording material conveying direction S.

In this way, when the belt 9 is laterally shifted in the longitudinal direction of the heater (that is, the generatrix direction of the belt), and collides with one of the correcting mechanisms 110R and 110L, only the end portion of the belt 9 on the downstream side in a lateral shift direction receives a force towards the upstream side in the recording material conveying direction. Due to this principle, the alignment of the belt 9 with respect to the roller 3 is changed, the orientation of the belt is corrected, and the belt moves away from the movable member (that is, in a direction opposite to the direction of arrow M1 shown in FIG. 23B), so that the force that is applied to the end surface of the belt 9 is restricted. This makes it possible to restrict breakage of the belt. As mentioned above, the movable member 111 is urged by the springs 14. Therefore, when the belt 9 moves in a direction opposite to the direction of arrow M1 from the state shown in FIG. 23B, the movable member 111 is pushed back to the position shown in FIG. 23A or to a position between the positions shown in FIGS. 23A and 23B.

Figure 24A:
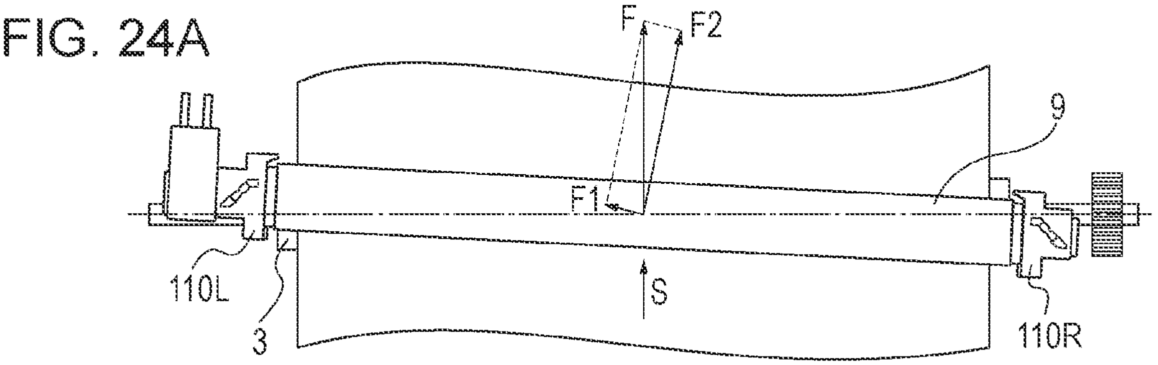
FIGS. 24A to 24D each illustrate a force that is applied to a belt.
Figure 24B:
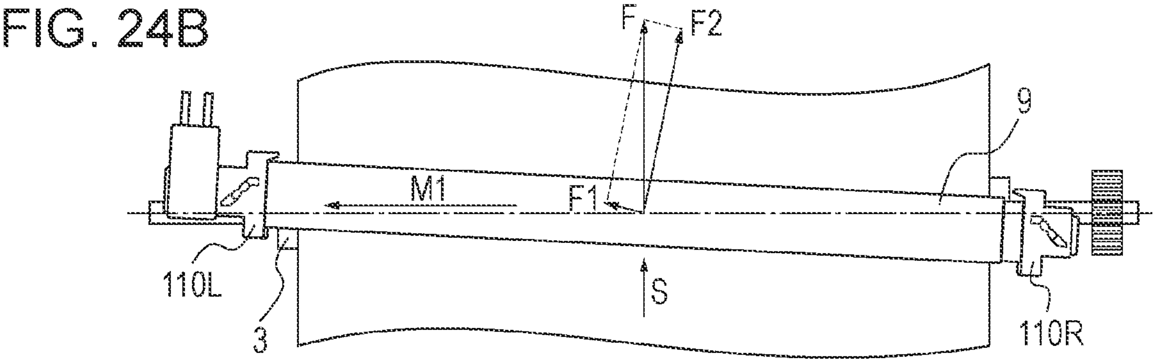
Figure 24C:
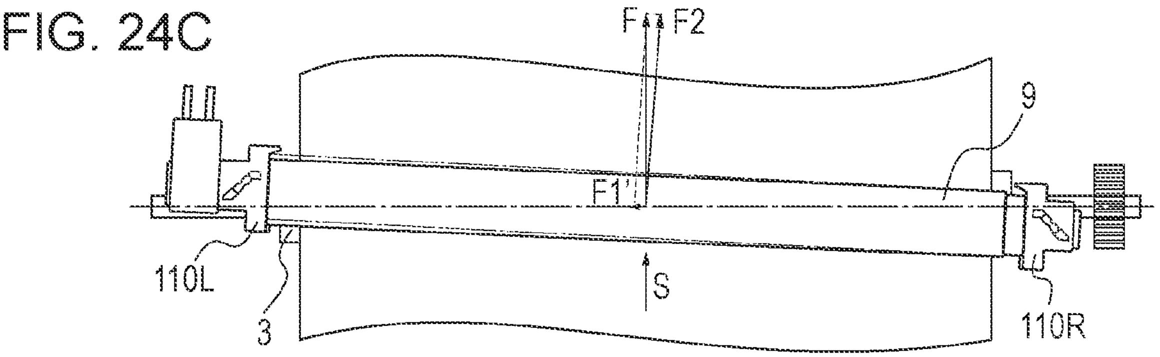

Next, the principle of reducing stress that is applied to the end surfaces of the belt 9 is further described with reference to FIGS. 24A to 24C. FIGS. 24A to 24C each illustrate a heating unit 2 and the roller 3 when seen from the side of the belt 9. FIG. 24A illustrates a state in which the belt is laterally shifted. FIG. 24B illustrates a state in which the belt is no longer laterally shifted. FIG. 24C illustrates a state in which the inclination of the belt 9 has been corrected.

In general, lateral shift of the belt 9 in the generatrix direction is caused by the roller 3 and the belt 9 being out of alignment with each other. FIG. 24A illustrates a state in which the roller 3 and the belt 9 are out of alignment with each other. That is, FIG. 24A illustrates a state in which the end portion of the belt at the side of the correcting mechanism 110L is inclined towards the downstream side in the recording material conveying direction S and in which the end portion of the belt at the side of the correcting mechanism 110R is inclined towards the upstream side in the recording material conveying direction S. As shown in FIG. 24A, a force F is applied to the belt 9 due to the rotation of the roller 3. The force F can be broken down into a force F1 in the generatrix direction of the belt 9 and a force F2 in a direction that is orthogonal to the generatrix direction. The belt 9 is laterally shifted towards the correcting mechanism 110L by the force F1. When the belt 9 contacts and pushes the movable member 111 of the correcting mechanism 110L (FIG. 24B), the movable member 111 is guided to the holding member 112 and moves towards the upstream side in the recording material conveying direction S. The movement of the movable member 111 corrects the orientation of the belt 9 as shown in FIG. 24C on the basis of the aforementioned principle. Since the roller 3 and the belt 9 are no longer out of alignment, the angle between the force F and the generatrix direction of the belt 9 is changed. As a result, the force F1 is reduced (F1 to F1'), so that stress that is applied to the end surface of the belt 9 is also reduced.

As mentioned above, since it is possible to reduce stress that is applied to the end surfaces of the belt 9, it is possible to suppress wear of the end surfaces of the belt 9.

Figure 24D:
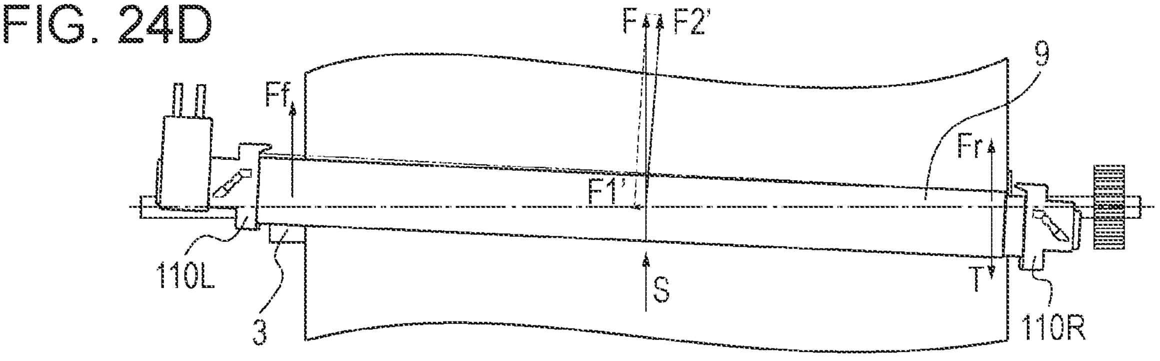
Figure 25:
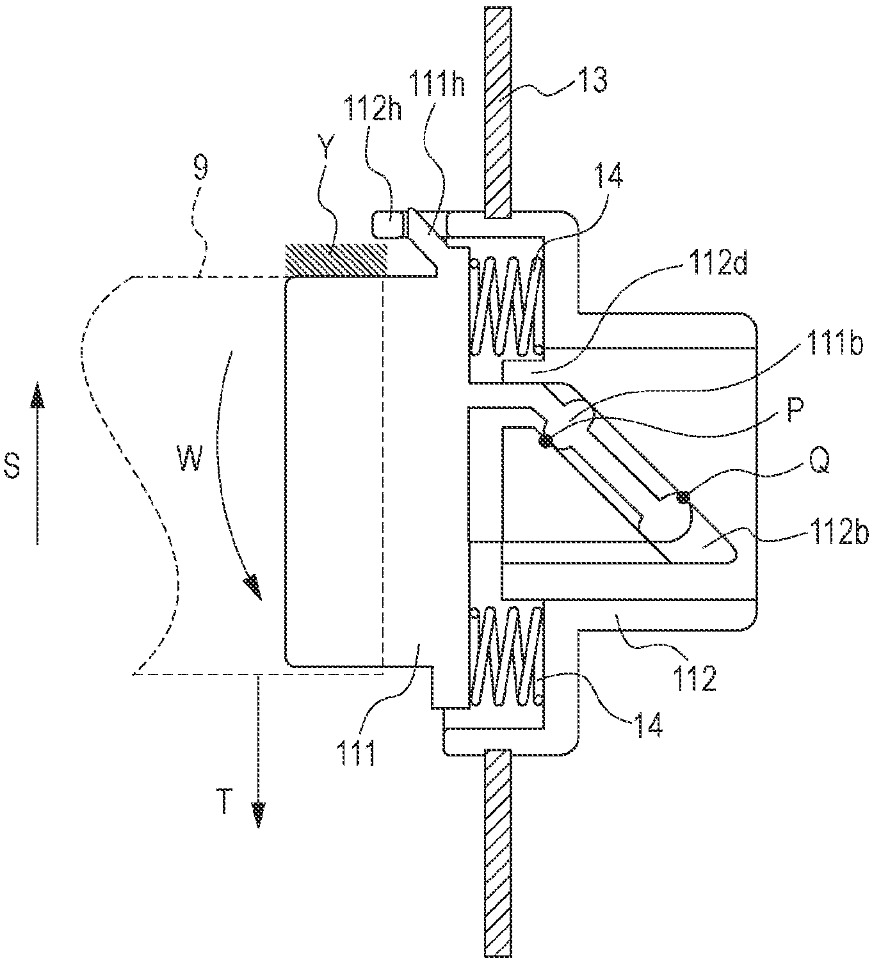
FIG. 25 illustrates a mechanism that restricts the orientation of the movable member.

When the position of the center of a roller section of the pressure roller 3 in the longitudinal direction and the position of the center of a sheet S in a width direction are displaced from each other, conveying forces that are applied to the belt 9 as a result of rotation of the pressure roller 3 become nonuniform at both end portions of the belt 9. For example, when, as shown in FIG. 24D, the sheet S is displaced towards the side of the correcting mechanism 110R, an area where the pressure roller 3 directly contacts the belt 9 is longer at the side of the correcting mechanism 110L than at the side of the correcting mechanism 110R. Friction force between the pressure roller 3 and the belt 9 is greater than friction force between paper and the belt 9. Therefore, rotary force of the belt 9 generated by the pressure roller 3 is such that a rotary force Ff at the correcting mechanism 110L is greater than a rotary force Fr at the correcting mechanism 110R. As a result, the rotation of the end portion of the belt at the side of the correcting mechanism 110R is delayed. Therefore, the end portion of the belt at the side of the correcting mechanism 110R moves towards the upstream side in the sheet conveying direction by a force T. At this time, the end portion of the belt at the side of the correcting mechanism 110R pushes the movable member 111 towards the upstream side in the sheet conveying direction. As shown in FIG. 25, the pushed movable member 111 tries to rotate around a contact point P between the recess 112*b* and the protrusion 111*b* in the direction of arrow W and starts inclining. When the force T exceeds a force Tlimit, at which the movable member 111 is positionally displaced, the movable member 111 is inclined, as a result of which a hatched portion Y of the movable member 111 is positionally displaced toward the upstream side in the sheet conveying direction. As in FIG. 24A, the belt 9 is out of alignment with an axis of rotation (alternate long and short dashed lines) of the pressure roller. Therefore, in order to prevent the movable member from inclining, an inclination restricting mechanism that restricts the inclination of the movable member (inner-surface opposing portion) is provided. More specifically, a first engaging portion 111*h* is provided at the end-surface opposing portion 111*a* of the movable member 111, and a second engaging portion 112*h* is provided at the holding member 112. That is, the inclination restricting mechanism includes the first engaging portion provided at the end-surface opposing portion and the second engaging portion that is provided at the holding member and that engages with the first engaging portion.

When the movable member 111 starts to incline, the first engaging portion 111*h* and the second engaging portion 112*h* contact each other. As a result, the movable member 111 is further prevented from inclining. In a state in which the inclination of the movable member is restricted as a result of contact of the first engaging portion 111*h* and the second engaging portion 112*h* with each other, the protrusion 111*b* of the movable member and the recess (guide) 112*b* of the holding member contact each other at the point P, which is a rotational center of the movable member in the direction of arrow W. However, in the direction of arrow W, at other portions (that is, portions near a point Q in FIG. 25), the protrusion and the recess are separated from each other. According to an experiment, the inclination restricting mechanism makes it possible to increase the force TLimit, at which the movable member is positionally displaced when the portion Y of the movable member is pushed towards the upstream side in the conveying direction, by a factor of 1.8. Although, in the sixth embodiment, contact surfaces of the two engaging portions are shaped so as to be parallel to the sheet conveying direction, the contact surfaces may be shaped so as to be inclined with respect to the conveying direction. This makes it possible to continue maintaining the alignment of the belt 9 without inclining the movable member 111, and to continue restricting lateral shift of the belt while reducing stress that is applied to the end surface of the belt.

In the embodiment, it is possible to provide advantages when, as a result of conveying the sheet S that is displaced from its normal position in a width direction, the rotary force F that is transmitted to the belt 9 from the pressure roller 3 becomes nonuniform in the longitudinal direction and the force T that tries to move an end surface of the belt at the side that is not laterally shifted towards the upstream side in the sheet conveying direction is generated.

Figure 26:
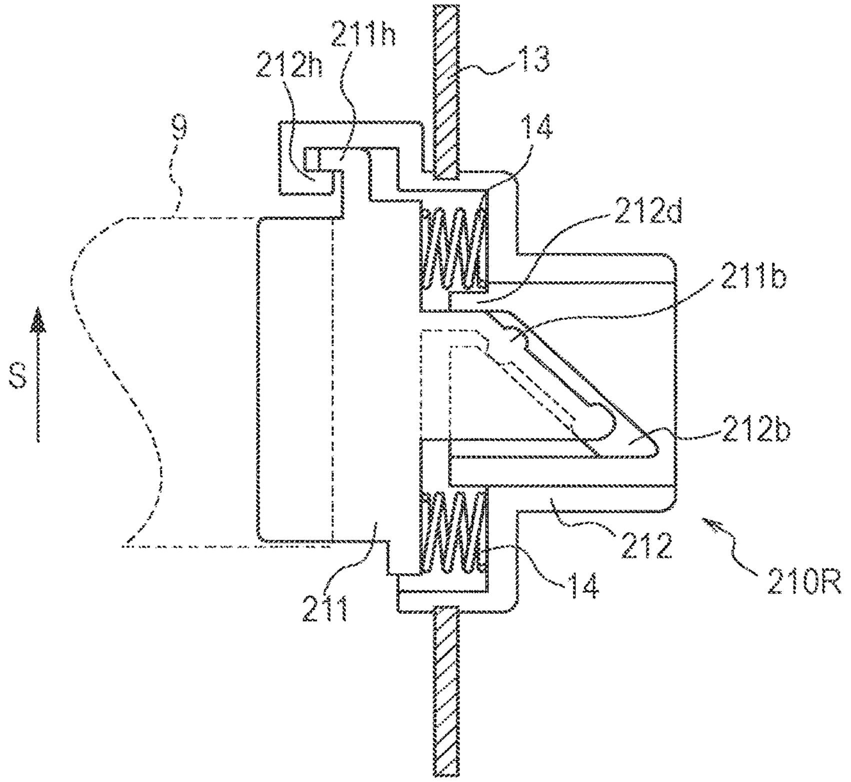
FIG. 26 shows a modification of the sixth embodiment.

The first engaging portion and the second engaging portion may have shapes shown in FIG. 26. In FIG. 26, a rib-shaped portion (second engaging portion) 212*h* is provided at a holding member 212 of a correcting mechanism 210R, a protrusion (first engaging portion) 211*h* is provided at a movable member 211, and the protrusion 211*h* is held by the rib-shaped portion 212*h*. Even such shapes make it possible to reliably prevent the movable member at the side where the belt is not laterally shifted from being positionally displaced towards the upstream side in the sheet conveying direction by the pushing force from the belt. Since, in FIG. 26, reference numerals 211*b*, 212*b*, and 212*d* represent parts that have the same functions as those of the protrusion 111*b*, the recess 112*b*, and the stopper 112*d* shown in FIG. 22, they are not described.

Seventh Embodiment

Next, a seventh embodiment of the present invention is described with reference to FIGS. 27 to 29. Descriptions that are the same as those of the sixth embodiment are not given. Although, in the sixth embodiment, the holding member restricts the inclination of the movable member, parts other than the holding member restrict the inclination of the movable member in the seventh embodiment.

Figure 27:
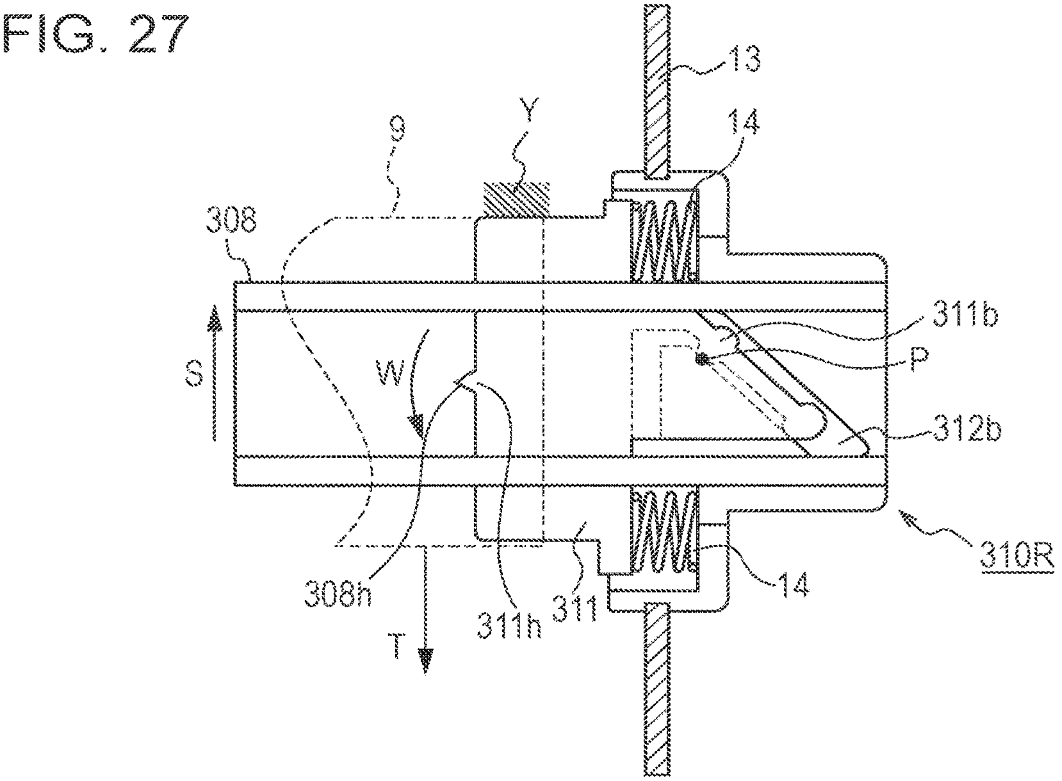
FIG. 27 illustrates a seventh embodiment.

In an example shown in FIG. 27, a protrusion (first engaging portion) 311*h* is provided at a movable member 311, and a groove (second engaging portion) 308*h* with which the protrusion 311*h* engages is provided at a pressure stay 308. In FIG. 27, when a belt 9 is laterally shifted towards a correcting mechanism 310L that is disposed opposite to a correcting mechanism 310R, the movable member 311 in the correcting mechanism 310R is urged by an urging member 14, and collides with the pressure stay 308, so that the protrusion 311*h* and the groove 308*h* engage each other.

As in the sixth embodiment, when a force T that causes the belt 9 and a pressure roller 3 to be out of alignment acts, the movable member 311 in the correcting mechanism 310R is pushed towards an upstream side in a sheet conveying direction. The pushed movable member 311 tries to incline in the direction of arrow W around a contact point P between a slide rib-shaped portion 311*b* and a guide 312*b*. Here, the protrusion 311*h* of the movable member 311 and the groove 308*h* of the pressure stay 308 engage each other to prevent the movable member 311 from inclining.

Figure 28:
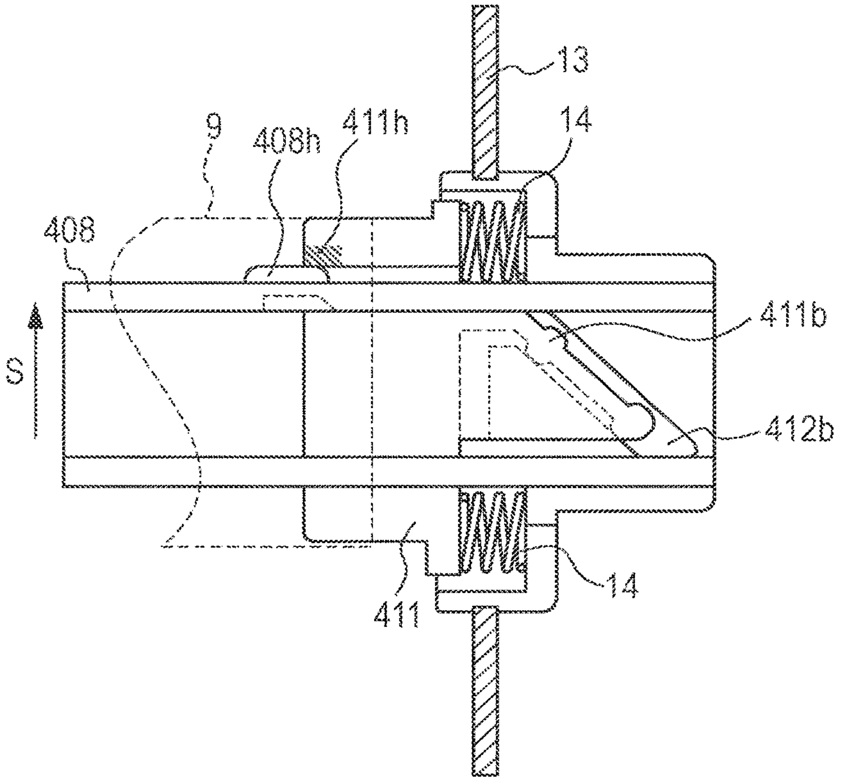
FIG. 28 illustrates a modification of the seventh embodiment.

In an example shown in FIG. 28, a protrusion (second engaging portion) 408*h* is provided at a side surface of a pressure stay 408 at a downstream side in a sheet conveying direction, and the protrusion 408*h* is caused to contact an abutting portion (first engaging portion) 411*h* of the movable member 411 to prevent the movable member 411 from inclining.

Figure 29:
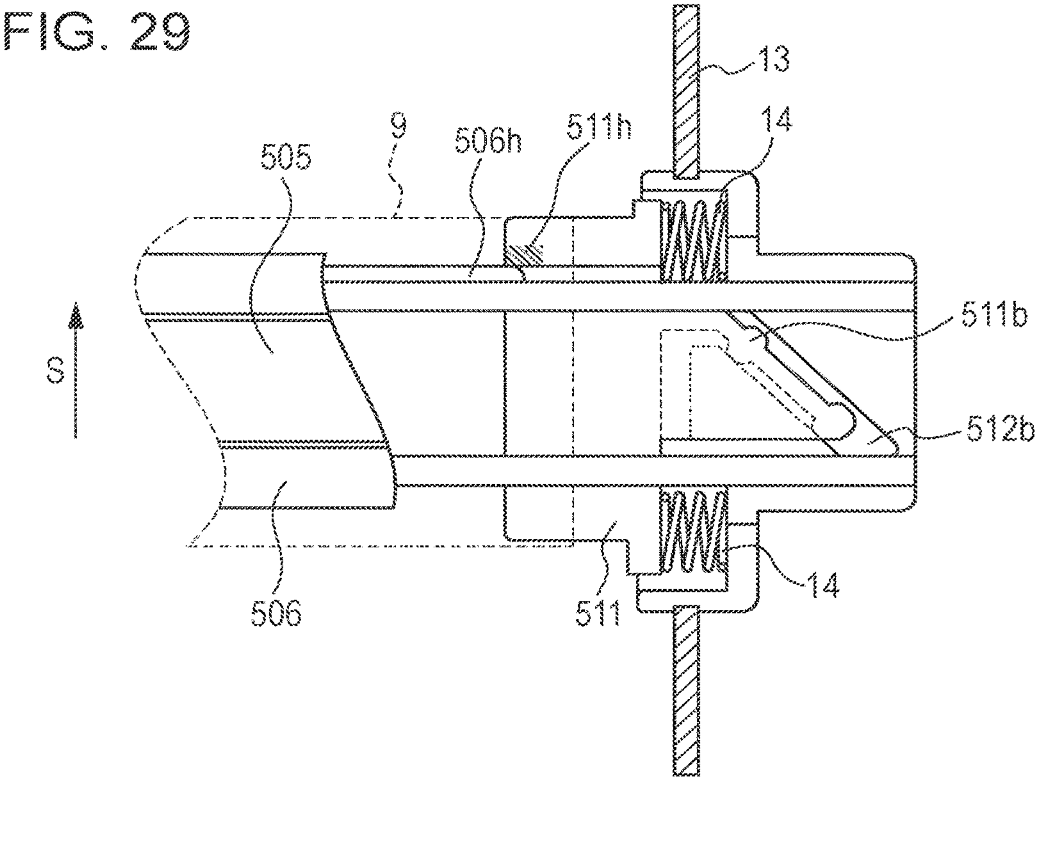
FIG. 29 illustrates another modification of the seventh embodiment.

In an example shown in FIG. 29, a protrusion (second engaging portion) 506*h* is provided at a side surface of a heater holder 506 (which holds a ceramic heater 505) at a downstream side in a sheet conveying direction, and the protrusion 506*h* is caused to contact an abutting portion (first engaging portion) 511*h* of a movable member 511 to prevent the movable member 511 from inclining. Since, in FIGS. 27 to 29, reference numerals 311*b*, 312*b*, 411*b*, 412*b*, 511*b*, and 512*b* represent parts that have the same functions as those of the protrusion 111*b* and the recess 112*b* shown in FIG. 22, they are not described.

Eighth Embodiment

Next, correcting mechanisms 610R and 610L that correct the inclination of a belt 9 according to an eighth embodiment are described with reference to FIGS. 30A to 34B. The shape of the correcting mechanism 610R and the shape of the correcting mechanism 610L are substantially axially symmetrical with reference to a conveyance reference X of a recording material P. Therefore, the correcting mechanisms 610R and 610L are described by primarily describing the correcting mechanism 610R and partly describing the correcting mechanism 610L.

Figure 30A:
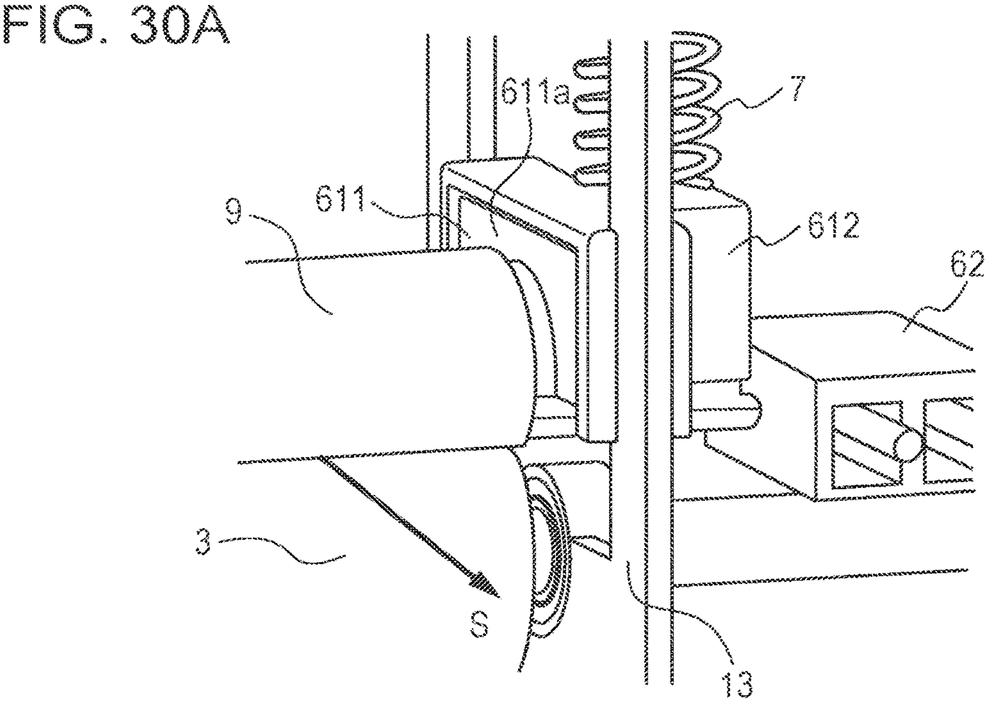
FIGS. 30A and 30B are, respectively, a perspective view and a sectional view of a correcting mechanism according to an eighth embodiment.
Figure 30B:
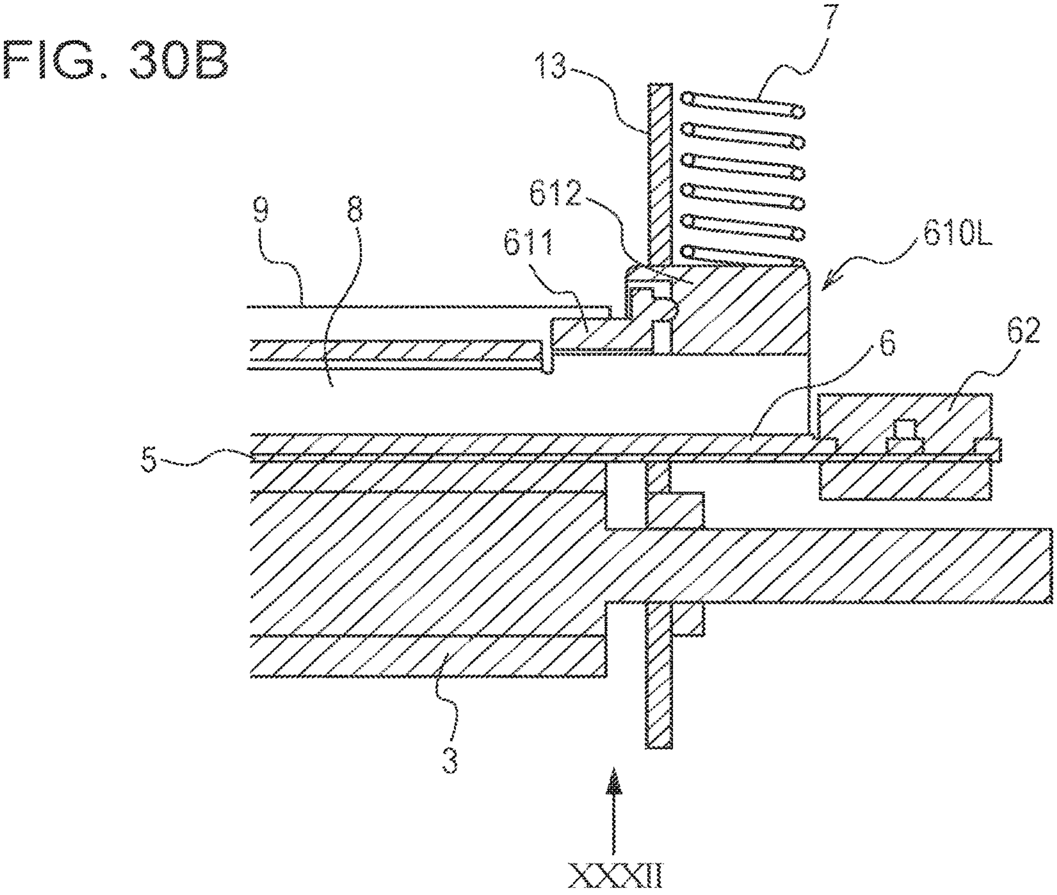
Figure 31A:
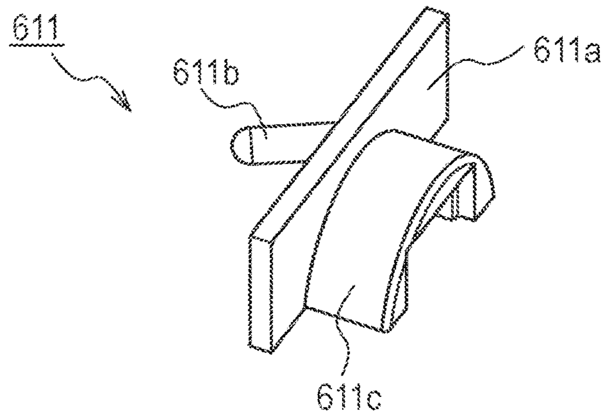
FIG. 31A is a perspective view of a movable member.
Figure 31B:
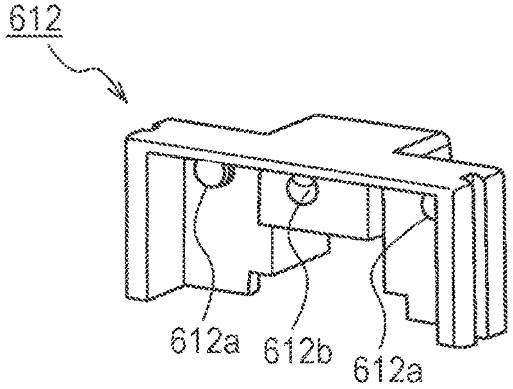
FIG. 31B is a perspective view of a holding member, and FIGS. 31C and 31D each illustrate the holding member.
Figure 31C:
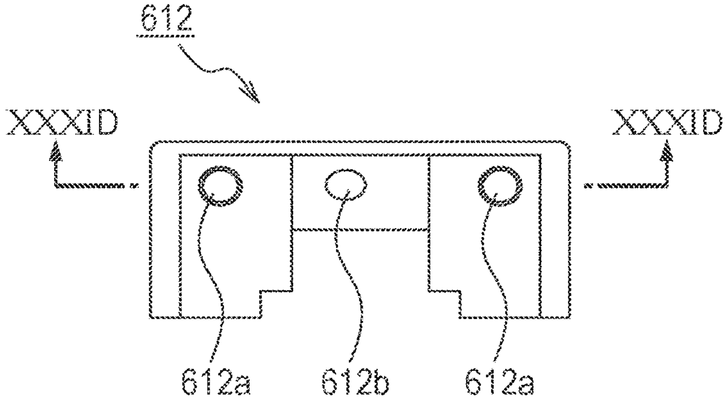
Figure 31D:
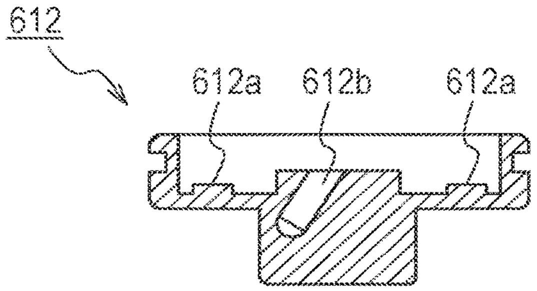
Figure 32:
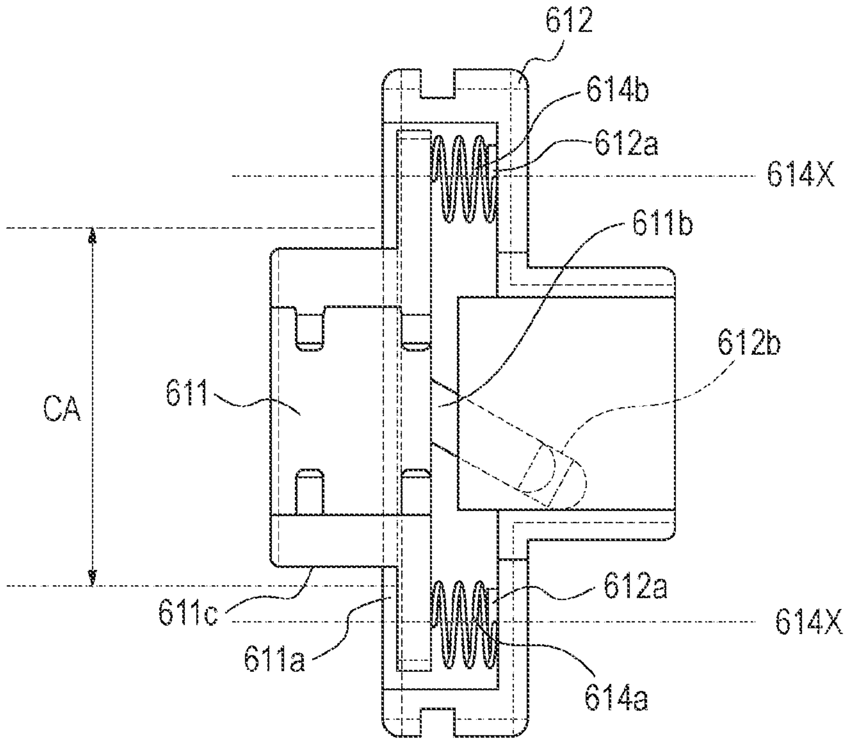
FIG. 32 is a sectional view of the correcting mechanism.

FIG. 30A is a perspective view of the correcting mechanism 610L. FIG. 30B is a sectional view of the correcting mechanism 610L when seen from a downstream side in a recording material conveying direction. FIG. 31A is a perspective view of a movable member 611 (described below). FIGS. 31B to 31D are a perspective view, a front view, and a sectional view taken along line XXXID of a holding member 612 that holds the movable member 611. Further, FIG. 32 illustrates the correcting mechanism 610L when seen from the direction of arrow XXXII in FIG. 30B. FIGS. 33A to 34B each illustrate a mechanism that corrects the orientation of the belt by the correcting mechanisms.

The correcting mechanism 610L includes a movable member (restricting member) 611, a holding member 612 that holds the movable member 611, and compression springs (urging members) 614 (614*a*, 614*b*) that urge the movable member 611. As described above, the holding member 612 is fitted to a U-shaped recess of a frame 13 of a fixing device. This causes the position of the holding member 612 in a longitudinal direction of a heater and the position of the holding member 612 in the recording material conveying direction to be substantially determined. Since the holding member 612 is urged towards a roller 3 by a spring 7, the holding member 612 is in a substantially secured state.

The movable member 611 is a part that is movably engaged with the holding member 612. The movable member 611 is in contact with a cutaway portion provided at an end portion of a stay 8 in a longitudinal direction. A slight gap is provided between the holding member 612 and a top portion of the movable member 611. As shown in FIG. 30A, the movable member 611 has an end-surface opposing portion 611*a* that opposes an end surface of the belt 9. When the belt 9 is laterally shifted in a generatrix direction thereof, the end surface of the belt 9 collides with the end-surface opposing portion 611*a*. The movable member 611 has an inner-surface opposing portion 611*c* that opposes an inner surface of the end portion of the belt 9. A slight clearance is provided between the inner surface of the belt 9 and the inner-surface opposing portion 611*c*. The inner-surface opposing portion 611*c* has the function of guiding the inner surface of the belt 9 when the belt rotates.

As shown in FIG. 31A, the movable member 611 has a protrusion 611*b* extending obliquely with respect to the longitudinal direction of the heater. As shown in FIGS. 31B to 31D, the holding member 612 has a recess (guide) 612*b* extending obliquely with respect to the longitudinal direction of the heater. When the movable member 611 and the holding member 612 are combined, the protrusion 611*b* of the movable member 611 is fitted in the recess 612*b* of the holding member 612. By virtue of this structure, the movable member 611 is slidably held along the recess 612*b* of the holding member 612.

Reference numerals 614*a* and 614*b* denote compression springs (urging members) that urge the movable member 611 away from a seating surface 612*a* of the holding member 612 (that is, urge the movable member 611 towards an end surface of the belt). There are a plurality of urging members in the embodiment. Coil springs are used as the urging members. While the movable member 611 is not pushed by the belt 9, the coil springs 614*a* and 614*b* are disposed at an area that is outside of an area CA (see FIG. 32) of the movable member 611 with which the end surface of the belt. Although described later, the coil springs are disposed so that at least positions 614X at the centers of the coil springs are positioned outside of the area CA. The spring holding seat 612*a* on which the coil springs are mounted are provided at the holding member 612.

Next, the operations of the correcting mechanisms 610 are described with reference to FIGS. 32 to 34B. FIGS. 32 and 33A each illustrate a state of a correcting mechanism in which the end surface of the belt 9 is not in contact with the end-surface opposing portion 611*a*. When the belt 9 is rotated by following the rotation of the roller 3, the belt 9 contacts the inner-surface opposing portion 611*c* of the movable member 611 in an area that is disposed upstream of the heater 5 in a rotation direction of the belt. In contrast, in an area that is disposed downstream of the heater 5 in the rotation direction of the belt, the belt 9 is separated from the inner-surface opposing portion 611*c* of the movable member 611.

When the end surface of the belt 9 is not in contact with the end-surface opposing portion 611*a*, the movable member 611 that is urged by the springs 614*a* and 614*b* is positioned at a farthest location from the spring holding seat 612*a* in the holding member 612. At this time, the movable member 611 collides with a stopper (not shown) provided at the holding member 612, so that, even if the movable member 611 is urged by the springs 614*a* and 614*b*, the movement of the movable member 611 is restricted, as a result of which the movable member 611 is positioned.

As shown in FIG. 33A, when the end surface of the belt 9 is not in contact with the end-surface opposing portion 611*a*, the distance between the end surface of the belt 9 and the end-surface opposing portion 611*a* of the movable member 611 is D1. The distance from the holding seat 612*a* of the holding member 612 to the end-surface opposing portion 611*a* of the movable member 611 is D2.

Figure 33B:
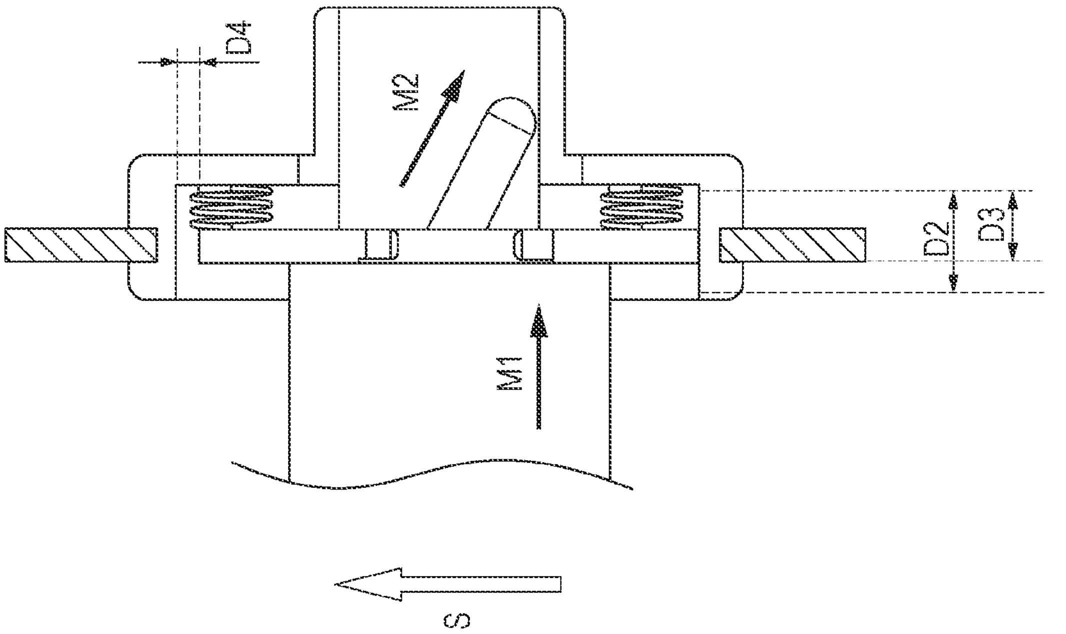
FIGS. 33A and 33B are each an explanatory view of the operation of the correcting mechanism.
Figure 33A:
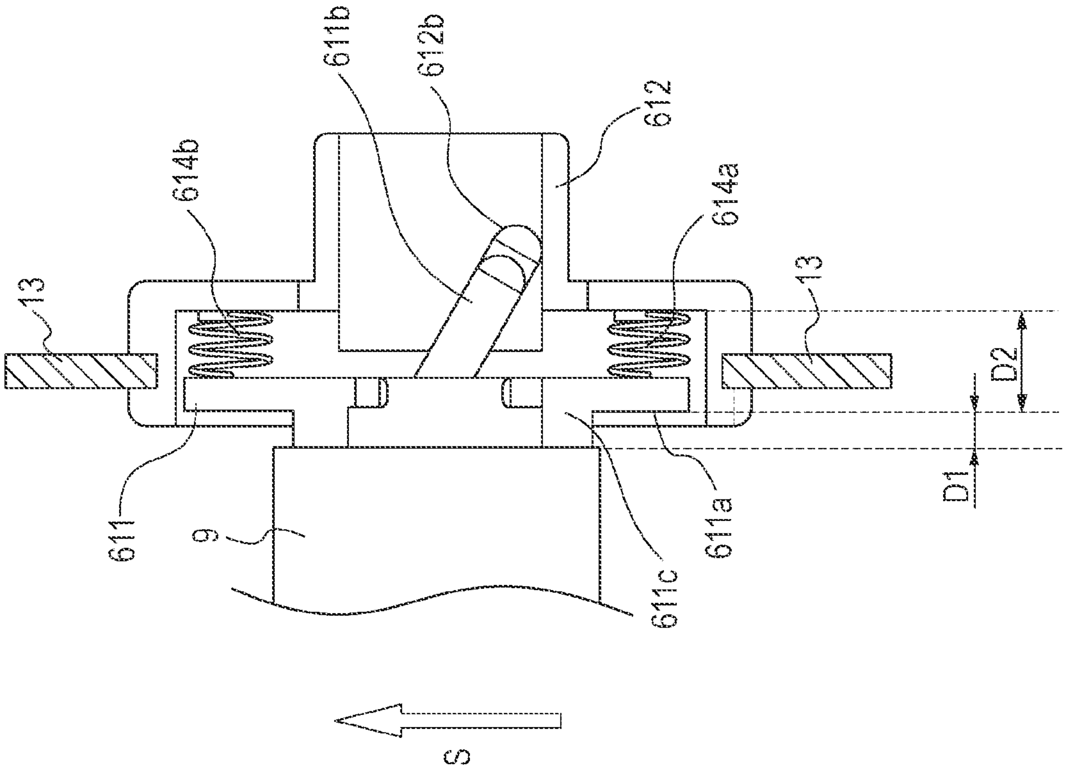

FIG. 33B shows a state in which the end surface of the belt 9 contacts the end-surface opposing portion 611*a* as a result of lateral shift of the belt 9 in the direction of arrow M1 and the belt 9 pushes the movable member 611 in the direction of arrow M1 against the urging force of the springs 614*a* and 614*b*.

When, for example, the belt 9 is laterally shifted towards the movable member 611 as a result of, for example, the roller 3 and the belt 9 being out of alignment with each other, the end surface of the belt 9 comes into contact with the movable member 611. When the belt 9 is laterally shifted further, the belt 9 pushes the movable member in the direction of arrow M1 against the urging force of the springs 614*a* and 614*b*, so that the movable member 611 moves by making use of a force of lateral shift of the belt.

Since the protrusion 611*b* of the movable member 611 moves along the recess 612*b* of the holding member 612, the movable member 611 moves in the direction of arrow M2. When the protrusion 611*b* collides with an end portion of the recess 612*b*, the movable member 611 stops moving. As this time, as shown in FIG. 33B, the distance from the holding seat 612*a* of the holding member 612 to the end-surface opposing portion 611*a* of the movable member 611 is D3 (<D2). Compared to the state in FIG. 33A, the movable member 611 is moved through a distance D4 towards an upstream side in the recording material conveying direction S.

As mentioned above, when the belt 9 is rotating, the inner surface of the belt 9 is in contact with the inner-surface opposing portion 611*c* of the movable member 611. Therefore, when, as shown in FIG. 33B, the movable member 611 is moved towards the upstream side in the recording material conveying direction S, the inner-surface opposing portion 611*c* pushes the inner surface of the belt 9, so that the end portion of the belt at the side of the correcting mechanism 610L moves towards the upstream side in the recording material conveying direction S. In contrast, since the correcting mechanism 610R that is positioned opposite to the correcting mechanism 610L in the longitudinal direction of the heater is not pushed by the end surface of the belt 9, the movable member of the correcting mechanism 610R does not move.

When the movement direction of lateral shift of the belt 9 is in the opposite direction, that is, when the belt collides with the correcting mechanism 610R, only the movable member in the correcting mechanism 610R moves towards the upstream side in the recording material conveying direction S. This movement causes the end portion of the belt at the side of the correcting mechanism 610R to move towards the upstream side in the recording material conveying direction S.

In this way, when the belt 9 is laterally shifted in the longitudinal direction of the heater (that is, the generatrix direction of the belt), and collides with one of the correcting mechanisms 610R and 610L, only the end portion of the belt 9 on the downstream side in a lateral shift direction receives a force towards the upstream side in the recording material conveying direction. Due to this principle, the alignment of the belt 9 with respect to the roller 3 is changed, the orientation of the belt is corrected, and the belt moves away from the movable member (that is, in a direction opposite to the direction of arrow M1 shown in FIG. 33B), so that the force that is applied to the end surface of the belt 9 is restricted. This makes it possible to restrict breakage of the belt. As mentioned above, the movable member 611 is urged by the springs 614*a* and 614*b*. Therefore, when the belt 9 moves in a direction opposite to the direction of arrow M1 from the state shown in FIG. 33B, the movable member 611 is pushed back to the position shown in FIG. 33A or to a position between the positions shown in FIGS. 33A and 33B.

Figure 34A:
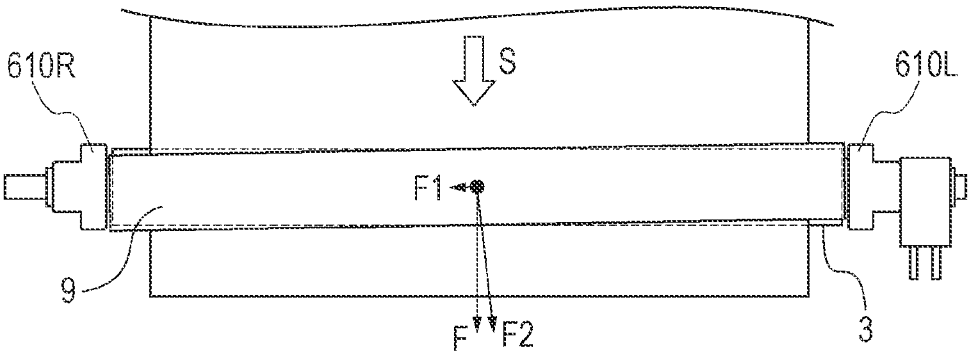
FIGS. 34A and 34B each illustrate a force that is applied to a belt.
Figure 34B:
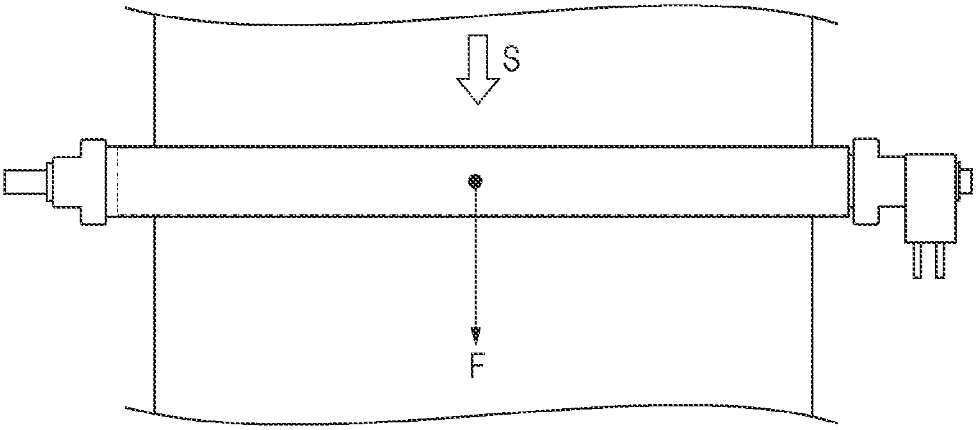

Next, the principle of reducing stress that is applied to the end surfaces of the belt 9 is further described with reference to FIGS. 34A and 34B. FIGS. 34A and 34B each illustrate the heating unit 2 and the roller 3 when seen from the side of the belt 9. FIG. 34A illustrates a state in which the belt is laterally shifted. FIG. 34B illustrates a state in which the orientation of the belt has been corrected.

In general, lateral shift of the belt 9 in the generatrix direction is caused by the roller 3 and the belt 9 being out of alignment with each other. FIG. 34A illustrates a state in which the roller 3 and the belt 9 are out of alignment with each other. That is, FIG. 34A illustrates a state in which the end portion of the belt at the side of the correcting mechanism 610R is inclined towards the downstream side in the recording material conveying direction S and in which the end portion of the belt at the side of the correcting mechanism 610L is inclined towards the upstream side in the recording material conveying direction S. As shown in FIG. 34A, a force F is applied to the belt 9 due to the rotation of the roller 3. The force F can be broken down into a force F1 in the generatrix direction of the belt 9 and a force F2 in a direction that is orthogonal to the generatrix direction. The belt 9 is laterally shifted towards the correcting mechanism 610R by the force F1. When the belt 9 contacts and pushes the movable member 611 of the correcting mechanism 610R, the movable member 611 is guided to the holding member 612 and moves towards the upstream side in the recording material conveying direction S. The movement of the movable member 611 corrects the orientation of the belt 9 as shown in FIG. 34B on the basis of the aforementioned principle. Since the roller 3 and the belt 9 are no longer out of alignment, the angle between the force F and the generatrix direction of the belt 9 is changed. As a result, the force F1 is reduced, so that stress that is applied to the end surface of the belt 9 is also reduced.

As mentioned above, since it is possible to reduce stress that is applied to the end surface of the belt 9, it is possible to suppress wear on the end surface of the belt 9.

Figure 35:
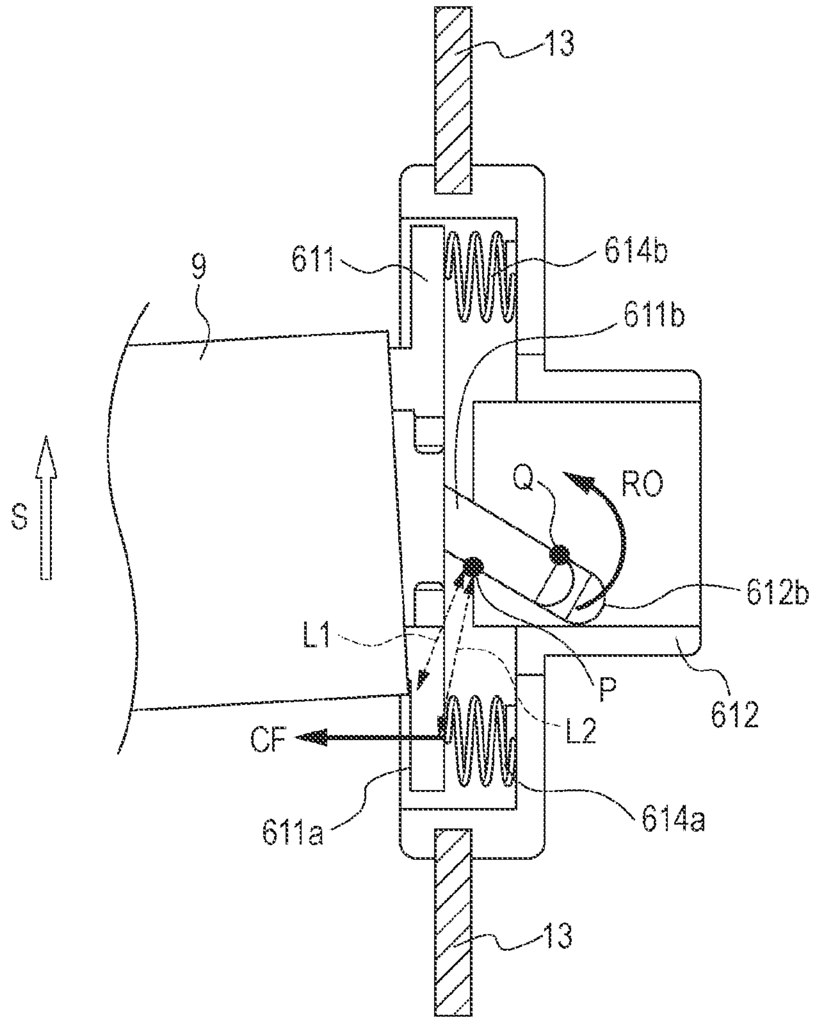
FIG. 35 illustrates a mechanism that restricts the orientation of the movable member.

When the belt 9 is laterally shifted as a result of the belt 9 and the roller 3 being out of alignment with each other, the end portion of the belt at the side that has been laterally shifted is inclined downstream in the sheet conveying direction. Thereafter, when the belt 9 collides with the end-surface opposing portion 611*a* of the movable member 611, as shown in FIG. 35, the belt 9 collides with an area of the end-surface opposing portion 611*a* at the upstream side in the sheet conveying direction. When the belt 9 has collided with the end-surface opposing portion 611*a*, the movable member 611 is subjected to a force that rotates the protrusion 611*b* (in the direction of arrow RO shown in FIG. 35) so as to collide with the recess 612*b* at a point Q with a point P of the protrusion 611*b* serving as a fulcrum. Therefore, the protrusion 611*b* of the movable member and the recess 612*b* of the holding member are jammed, as a result of which the movable member is prevented from moving smoothly.

In contrast, in the embodiment, while the movable member 611 is not pushed by the belt 9, the coil springs 614*a* and 614*b* as a whole are disposed at an area that is outside of the area CA (see FIG. 32) of the movable member 611 with which the end surface of the belt contacts. Therefore, with respect to a moment in the direction of arrow RO, a force CF of the spring 614*a* becomes an opposing force, and acts to reduce a force that is applied of each of the points P and Q. This allows the movable member 611 to move smoothly along the recess 612*b* of the holding member 612. The coil springs only need to be disposed so that the positions 614X of the centers of the coil springs are situated outside of the area CA.

While the belt 9 is being laterally shifted, the force of the spring 614*a* acts as a force that opposes the moment in the direction of arrow RO. This is because the spring 614*a* is disposed outside of the belt contact area CA at the end-surface opposing portion (that is, towards the upstream side in the sheet conveying direction). The magnitude of the opposing force that is generated as a result of compression of the spring 614*a* is the same as the magnitude of the force for pushing the end-surface opposing portion 611*a* that is generated as a result of lateral shift of the belt 9. A distance L2 up to the spring 614*a* is larger than a distance L1 from the fulcrum P to a point where the end-surface opposing portion 611*a* contacts the belt 9. Therefore, the force CF effectively acts to cancel the moment in the direction of arrow RO.

If the belt 9 is inclined in a direction that is opposite to the direction of inclination shown in FIG. 35, the spring 614*b* acts similarly to the spring 614*a* and provides an opposing force against a moment in a direction opposite to the direction of arrow RO, so that the movable member 611 is smoothly guided and moved.

Although, in the embodiment, correcting mechanisms are provided at both opposing ends of the belt, the aforementioned correcting mechanism may be provided at only a side towards which the belt is laterally shifted, with the direction in which the belt is laterally shifted being previously set in one direction. In addition, in the embodiment, the length of the belt is assumed as being less than the span between the two movable members. However, the length of the belt may be about the same as the span between the two movable members, that is, the two ends of the belt may be constantly in contact with the two movable members.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A fixing device that fixes an image formed on a recording material to the recording material, the fixing device comprising:
- a frame of the fixing device;
- a flexible cylindrical rotary member configured to rotate while contacting the recording material on which the image has been formed;
- a roller contacting with an outer surface of the rotary member and configured to form a fixing nip portion for pinching and conveying the recording material with the rotary member;
- a movable member including
  - an end-surface opposing portion configured to oppose an end-surface of the rotary member in a generatrix direction of the rotary member and
  - an inner-surface opposing portion configured to oppose an inner surface of the rotary member at an end portion of the rotary member in the generatrix direction, a holding member configured to movably hold the movable member, the holding member including a groove extending in a direction perpendicular to the generatrix direction and being attached to the frame by fitting the groove into the frame;

a first urging member configured to urge the holding member so as to form the fixing nip portion; and a second urging member provided between the movable member and the holding member, and configured to urge the movable member toward the rotary member, wherein the movable member is moved by the rotary member against a force of the second urging member when the rotary member shifts in the generatrix direction and comes into contact with the end-surface opposing portion of the movable member while the rotary member is rotating, and the inner-surface opposing portion pushes the inner surface of the rotary member by shifting of the rotary member, and wherein as seen in a conveying direction of the recording material, the first urging member is provided on a second side of the frame opposite to a first side of the frame where the inner-surface opposing portion of the movable member is provided.

* * * * *